(12) United States Patent
Ansfield

(10) Patent No.: US 8,553,149 B2
(45) Date of Patent: Oct. 8, 2013

(54) TELEVISION DISPLAY LEVELING

(75) Inventor: Frederick W. Ansfield, San Diego, CA (US)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 12/803,926

(22) Filed: Jul. 9, 2010

(65) Prior Publication Data

US 2012/0007990 A1   Jan. 12, 2012

(51) Int. Cl.
*H04N 21/485* (2011.01)
*H04N 3/23* (2006.01)

(52) U.S. Cl.
USPC ............................ 348/569; 348/746; 348/806

(58) Field of Classification Search
None
See application file for complete search history.

(56) References Cited

U.S. PATENT DOCUMENTS

| | | | |
|---|---|---|---|
| 4,448,510 A * | 5/1984 | Murakoshi | 396/53 |
| 6,317,114 B1 | 11/2001 | Abali et al. | |
| 6,626,412 B1 | 9/2003 | Lindsay | |
| 6,747,690 B2 * | 6/2004 | Molgaard | 348/208.1 |
| 7,353,069 B2 | 4/2008 | Tsai | |
| 7,833,152 B2 * | 11/2010 | Chatenever et al. | 600/117 |
| 2002/0093627 A1 * | 7/2002 | Oehler | 353/69 |
| 2004/0212699 A1 * | 10/2004 | Molgaard | 348/231.99 |
| 2007/0291188 A1 * | 12/2007 | Wernersson | 348/790 |
| 2009/0251565 A1 | 10/2009 | Molgaard | |

OTHER PUBLICATIONS

"Vehicle Clinometer / Tilt meter", AppsMeNow.com, http://www.appsmenow.com/review/38442-Vehicle_Clinometer_Tilt_Meter (Mar. 2009).*
Sean Flanagan, "Vehicle Clinometer Tilt meter by iAware", iTunes Preview, https://itunes.apple.com/us/app/vehicle-clinometer-tilt-meter/id308949901?mt=8.*
V.V. Prasad et al., "How to make an application run at boot-up?" Google Groups, Dec. 2008.*
E. Sadun, "iPhone Coding: Using the Accelerometer", Túaw.com (Sep. 10, 2007).*

* cited by examiner

*Primary Examiner* — David Czekaj
*Assistant Examiner* — David N Werner
(74) *Attorney, Agent, or Firm* — Sony Corporation

(57) ABSTRACT

A television leveling module determines, using at least one accelerometer module in response to activation of the television leveling module, an angle of orientation relative to horizontal of a television coupled to a horizontal level-adjustable mounting assembly. An indication of the angle of orientation relative to horizontal is displayed on a television display. The display of the indication of the angle of orientation relative to horizontal of the television is iteratively updated in response to detected adjustments of the angle of orientation. This abstract is not to be considered limiting, since other embodiments may deviate from the features described in this abstract.

40 Claims, 11 Drawing Sheets

US 8,553,149 B2

TELEVISION DISPLAY LEVELING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Flat panel televisions and other flat panel displays may be mounted to a wall or ceiling using a fixed mounting bracket that is attached to the wall or ceiling, respectively. A flat panel display is mounted to the fixed mounting bracket that supports the display.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
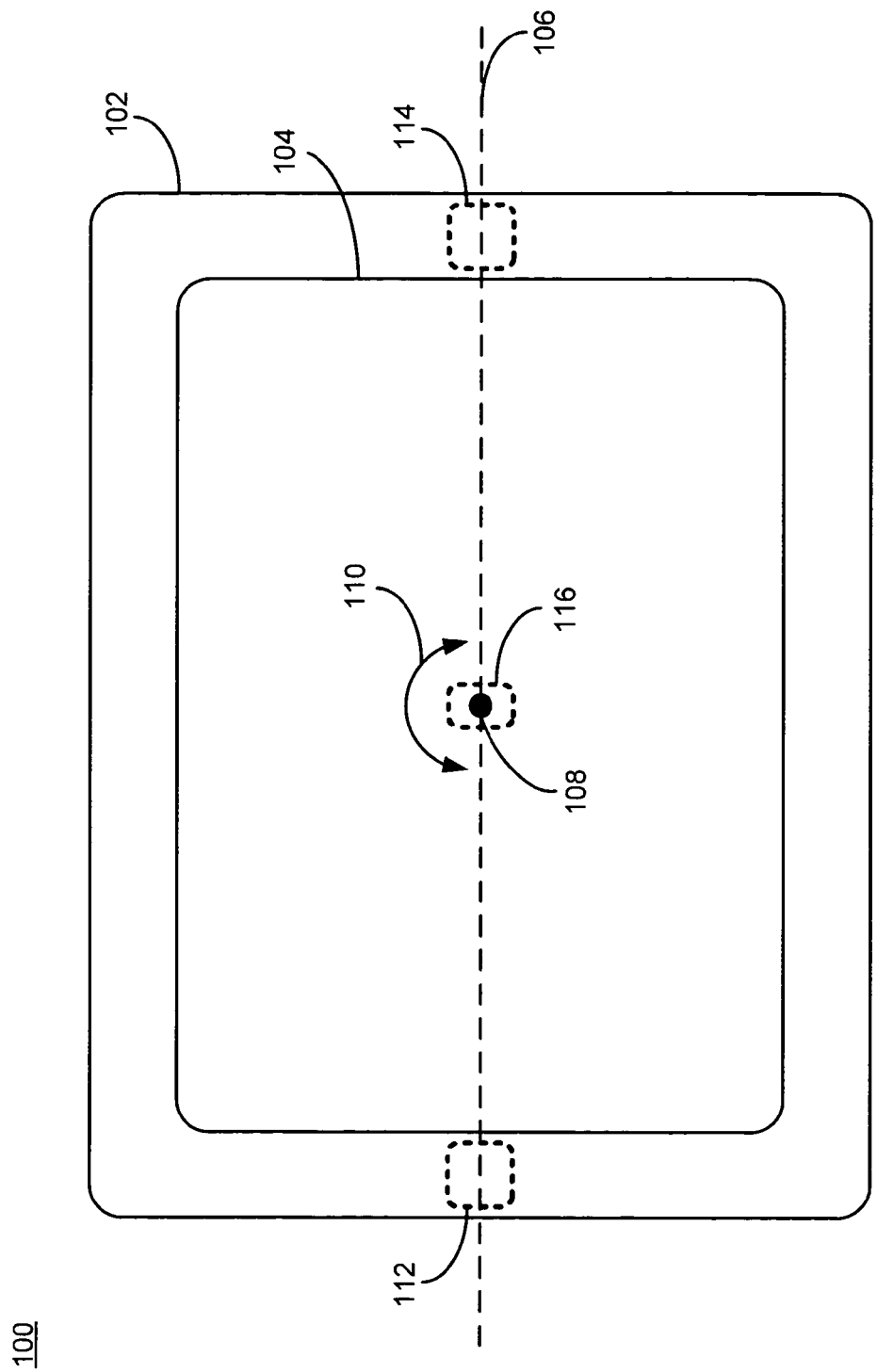
FIG. 1 is an illustration of an example of an implementation of a display device that implements television display leveling consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example," or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides tools for television display leveling. The television display leveling described herein allows horizontal leveling adjustments to be made dynamically to a flat panel display device, such as a television display or computer monitor, that is mounted either to a wall or a ceiling. The television display leveling described herein may be performed upon a user request or in response to activation of a television leveling module associated with such a display device.

Activation of the television leveling module may occur in response to detection of a voltage change across a mechanical momentary switch associated with the television. Activation of the television leveling module may also be implemented as a part of a television setup process that initiates when a menu item is selected or upon initial turn-on of the television set (e.g., an initial consumer power on activation of the television other than pre-shipping testing). Activation of the television leveling module may be performed automatically in response to determining that a difference exists between the accelerometer calibration information and the acceleration measurement information associated with at least one accelerometer module. Activation of the television leveling module may further be performed automatically in response to detecting a movement of the television. Accelerometer calibration information may be periodically compared with acceleration measurement information associated with an accelerometer module. In such an implementation, activation of the television leveling module may further be performed automatically in response to determining that a difference exists between the accelerometer calibration information and the acceleration measurement information associated with the at least one accelerometer module.

As such, many variations on activation of the television leveling module are possible and all are considered within the scope of the present subject matter. As a further example, a user may depress a physical switch on an enclosure of a television to request activation of the television display leveling described herein while mounting the display. Alternatively, an input signal, such as from a remote control device, may be received that indicates a user request to activate the television leveling module. In response to such an indication, the television leveling module may be activated. As another example, conductors within a wall or a ceiling mount may contact conductors associated with the television when the television is mounted to the wall or ceiling mount, and the television leveling module may be activated in response to contact via the conductions. The television leveling module may be powered from a separate battery-powered sub-circuit within the television so that the television does not have to be plugged into an alternating current (AC) receptacle to perform the television display leveling described herein.

Whether wall mounted or ceiling mounted, a horizontal level-adjustable mounting assembly provides granular horizontal level adjustment capabilities for the television or other display device. As such, preliminary mounting steps, as described in more detail within certain examples below, may be performed to coarsely level the television or other display device mounting assembly. The horizontal level-adjustable mounting assembly may then be adjusted by the user in response to signaling generated by the television leveling module. As such, iterative adjustments and user feedback from the television leveling module allow the user to granularly adjust the television or other display device orientation relative to horizontal level. In certain situations, a final mounting stage may be utilized to complete mounting of the television or other display device after horizontal level has been achieved.

Alternatively, the horizontal level-adjustable mounting assembly may be designed in many different ways to allow mounting of the television or other display device to be completed concurrently with completion of the horizontal level adjustment. It should be understood that certain example horizontal level-adjustable mounting assemblies are described herein for purposes of example. However, many other variations and designs for horizontal level-adjustable mounting assemblies are possible, and all are considered within the scope of the present subject matter.

Accelerometer technology provides a medium by which to make horizontal level determinations. Accelerometer technology allows for calibration and offset determinations for acceleration of an accelerometer device or module due to gravity relative to a case or enclosure within which the accelerometer device or module is attached. In response to a movement of an accelerometer device or module, a relative acceleration measurement may be provided. A determination of a distance of movement of the accelerometer may be derived in response to output signaling from the accelerometer device or module. Many forms of accelerometers exist and may be utilized in association with the present subject matter. A person of ordinary skill in the art would understand how to implement a given accelerometer to implement the present subject matter based upon the description herein. As such, specific details of the various accelerometer technologies are omitted herein for purposes of brevity.

In association with the television display leveling described herein, a determination may be made as to whether a television associated with the horizontal level-adjustable mounting assembly is level. In response to activation of the television leveling module or other initiation of horizontal television display leveling, a determination may be made as to whether a television associated with the horizontal level-adjustable mounting assembly is level via at least one accelerometer module associated with the television. In response to determining that the television is not level, the television leveling module may iteratively prompt a user to adjust the television via the horizontal level-adjustable mounting assembly. In response to each prompt, a horizontal level adjustment of the television may be detected via the at least one accelerometer module. Similarly, a determination is made as to whether the television is level based upon the horizontal level adjustment. In response to this iterative processing and in response to determining that the television is level based upon a first or subsequent horizontal level adjustment, an indication of successful horizontal leveling of the television is provided. The prompting of the user and the indication of successful horizontal leveling of the television may be performed either audibly via an audio output device or visually via a visual output device, such as a light emitting diode (LED), an LED array, or a display of the television or other display device.

Turning now to FIG. 1, a display device 100 that implements the display leveling described herein is illustrated. The display device 100 includes an enclosure 102 and a display 104. A horizontal line 106 references a horizontal level plane relative to which the display device 100 is to be horizontally leveled. The horizontal line 106 bisects a rotational pivot point 108. The rotational pivot point 108 allows rotation of the display device 100 relative to the horizontal line 106 as represented by arrows 110. The horizontal line 106 is shown as a dashed line to distinguish it from external and internal elements of the display device 100.

For purposes of the present subject matter, it is understood that a display device, such as the display device 100, that is to be horizontally leveled, may not be intended to be vertically plumb. For example, where the respective display device is to be mounted close to a ceiling or above a fireplace in a room, the top of the respective display device may be angled slightly out from a vertical plane to allow a relatively perpendicular angle of the display 104 relative to a position of a viewer, such as on a couch across the room. While the present subject matter is described in association with horizontal leveling, it is understood that vertical leveling, as well as deviations from vertical plumb in such situations may also be performed. As such, the present subject matter applies at least equally to vertical plumb and non-plumb installation implementations for the respective display device.

An accelerometer_1 112 is shown with a dashed-line representation to illustrate that it is situated within the enclosure 102 of the display device 100. For purposes of the present description, it is understood that a single accelerometer, such as the accelerometer_1 112 may be used to determine a level orientation of the display device 100 relative to the horizontal line 106. However, additional accelerometers may be included as appropriate for a given implementation. As such, an accelerometer_2 114 is also shown. For an implementation with two accelerometers, the accelerometer_1 112 and the accelerometer_2 114 may be spaced at equivalent distances from the rotational pivot point 108. It is further noted that commercially available accelerometers can currently provide three dimensional outputs suitable for use by implementations consistent with certain embodiments of the present invention.

In yet another alternative implementation, the accelerometer_1 112 may be implemented along with an accelerometer_3 116, rather than the accelerometer_2 114. In such an implementation, the accelerometer_3 116 may be situated on an axis, such as defined by the rotational pivot point 108, that is perpendicular to the horizontal line 106 such that it does not move when the display device 100 is rotated relative to the rotational pivot point 108. In such an implementation, the accelerometer_3 116 may form a calibration or bias accelerometer. The accelerometer_3 116 may provide measurement outputs relative to which the accelerometer_1 112 may be referenced to determine an acceleration and associated distance that the accelerometer_1 112 was moved vertically relative to the accelerometer_3 116. Many other possibilities exist for accelerometer placement, pairing, and calibration measurement offsets. As such, any and all possibilities are considered within the scope of the present subject matter.

FIG. 2A through FIG. 5B described below represent certain possible example implementations of displayed indications of an angle of orientation relative to horizontal on a television display. However, it is understood that the present examples may be modified to represent displayed indications of an angle of orientation relative to vertical without departure from the scope of the present subject matter. It is further understood that the examples described herein are representative and that many variations for implementation of displayed indications of an angle of orientation relative to either horizontal or vertical are possible and all such variations are considered within the scope of the present subject matter.

Figure 2A:
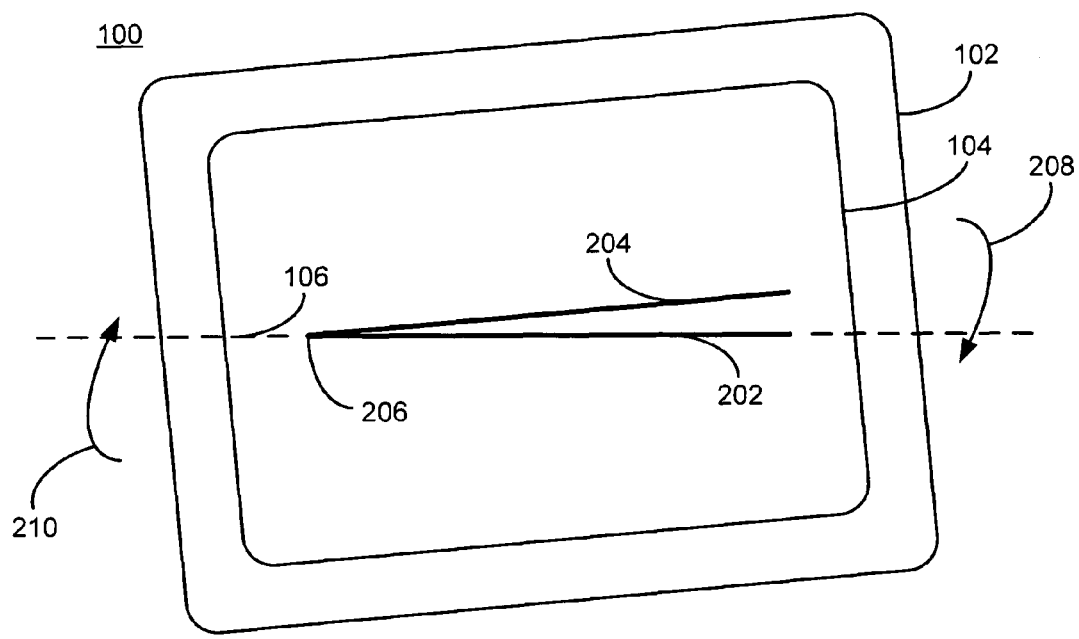
FIG. 2A is an illustration of an initial state of a display output for a first example of an implementation of a display of an indication of an angled orientation relative to horizontal on a television display consistent with certain embodiments of the present invention.
Figure 2B:
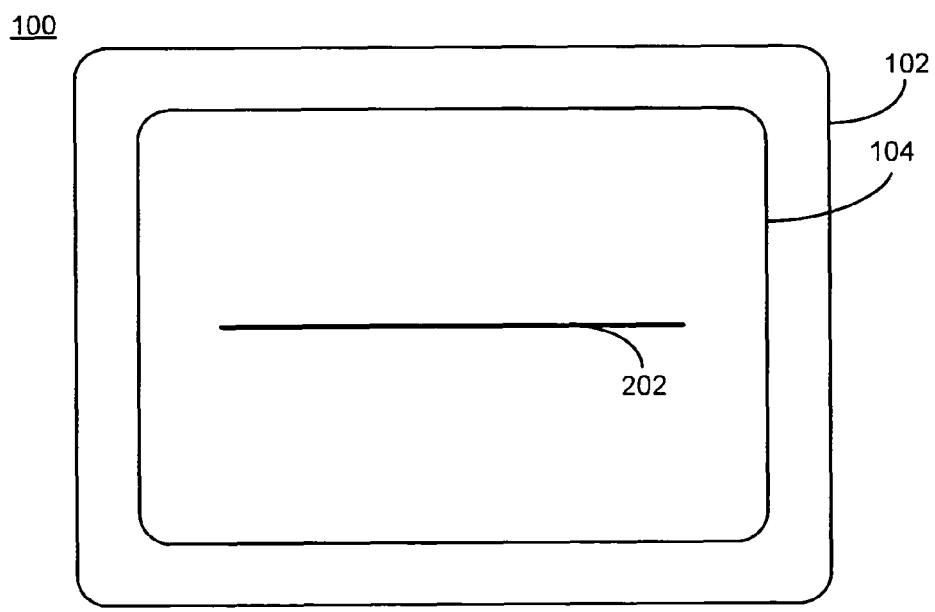
FIG. 2B is an illustration of a final state of a display output for a first example of an implementation of a display of an indication of an angled orientation relative to horizontal on a television display consistent with certain embodiments of the present invention.

FIG. 2A and FIG. 2B illustrate display outputs for a first example of an implementation of display of an indication of an angle of orientation relative to horizontal on a television display. FIG. 2A illustrates an initial state of the display device 100 after mounting in association with the horizontal level-adjustable mounting assembly. As can be seen from FIG. 2A, the display device 100 is out of level. A displayed horizontal line 202 is shown on the display 104. The displayed horizontal line 202 is coincident with the dashed horizontal line 106, shown in FIG. 1. An angle of orientation line 204 depicts an angle of orientation relative to the horizontal line 202.

As can be seen from FIG. 2A, the horizontal line 202 and the angle of orientation line 204 intersect at a point of intersection 206. Within the example of FIG. 2A, the point of intersection 206 represents a point of terminus of each of the horizontal line 202 and the angle of orientation line 204 on the display 104. Based upon the displayed output of the angle of orientation line 204 relative to the horizontal line 202, a user of the display device 100 may visually identify an indication of the angle of orientation relative to horizontal on the display 104. Further, the user may adjust the angle of orientation relative to horizontal of the display device 100 in response to the displayed indication of the angle of orientation relative to horizontal. As the user adjusts the display device 100, the display device 100 iteratively updates the display of the indication of the angle of orientation relative to horizontal in response to detected adjustments of the angle of orientation of the television. The arrows 208 and 210 are for illustration purposes only and show a general direction of rotation of the display device 100 to achieve a level horizontal orientation.

FIG. 2B illustrates a final state of the displayed output of the indication of angle of orientation relative to horizontal in response to detecting that the display device 100 is level. As can be seen from FIG. 2B, the angle of orientation line 204 is no longer displayed on the display 104, and only the display of the horizontal line 202 remains, to indicate that there is no angle of orientation relative to horizontal, and that the display device 100 is horizontally level. As such, the user may visually detect a level orientation of the display device 100 in response to the iterative updating of the display 104 with the indication of the angle of orientation relative to horizontal of the television.

Figure 2C:
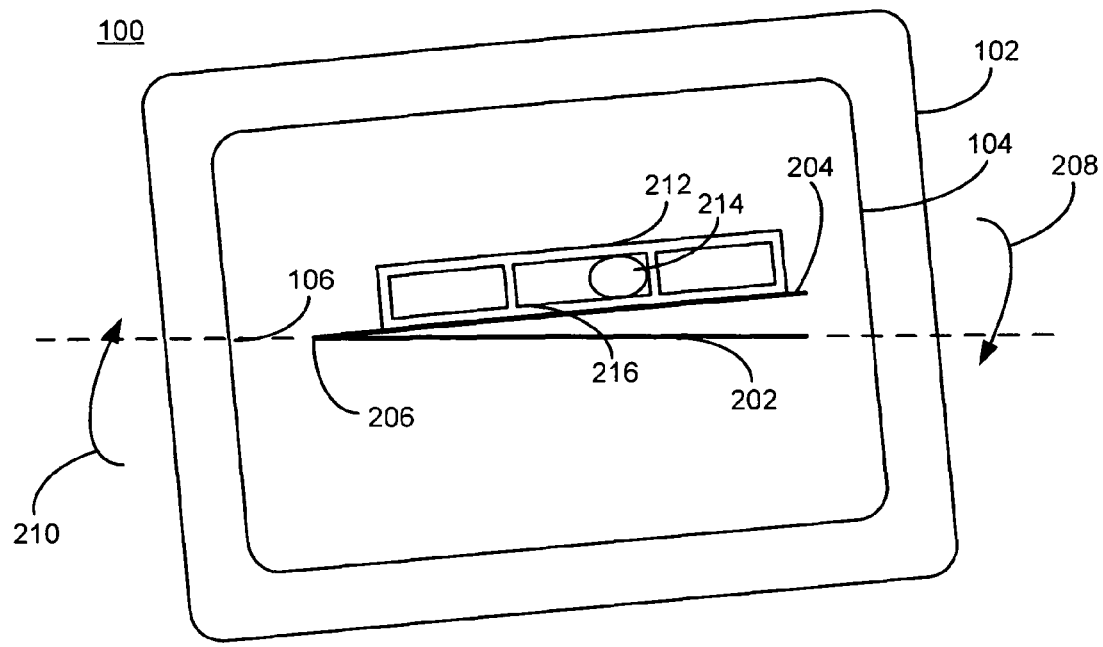
FIG. 2C is an illustration of an initial state of a display output for a second example of an implementation of display of an indication of an angle of orientation relative to horizontal on a television display that includes a graphical representation of a builder's level consistent with certain embodiments of the present invention.
Figure 2D:
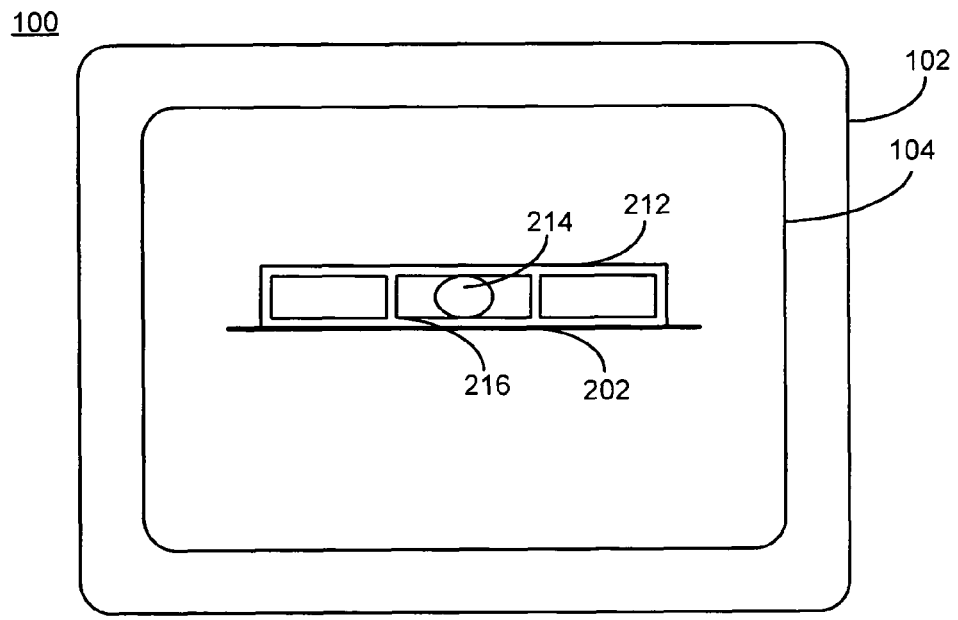
FIG. 2D is an illustration of a final state of a display output for a second example of an implementation of display of an indication of an angle of orientation relative to horizontal on a television display that includes a graphical representation of a builder's level consistent with certain embodiments of the present invention.

FIG. 2C and FIG. 2D illustrate display outputs for a second example of an implementation of display of an indication of an angle of orientation relative to horizontal on a television display that includes a graphical representation of a builder's level 212. FIG. 2C illustrates an initial state of the display device 100 after mounting in association with the horizontal level-adjustable mounting assembly. As can be seen from FIG. 2C, the display device 100 is out of level, as described in association with FIG. 2A above. The displayed horizontal line 202 and the angle of orientation line 204 are again shown on the display 104, along with the dashed horizontal line 106, as shown and described in association with FIG. 2A.

As can be seen from FIG. 2C, the builder's level 212 is displayed along the angle of orientation line 204. The builder's level 212 includes a graphical representation of a bubble 214. The bubble 214 is displayed along a right edge of an area 216 of the builder's level 212 to further illustrate the angle of orientation relative to horizontal of the display device 100. Based upon the displayed output of the angle of orientation line 204 relative to the horizontal line 202, a user of the display device 100 may visually identify an indication of the angle of orientation relative to horizontal on the display 104. Further, the user may adjust the angle of orientation relative to horizontal of the display device 100 in response to the displayed indication of the angle of orientation relative to horizontal. As the user adjusts the display device 100, the display device 100 iteratively updates the display of the indication of the angle of orientation relative to horizontal of the television in response to detected adjustments of the angle of orientation. The arrows 208 and 210 again illustrate a general direction of rotation of the display device 100 to achieve a level horizontal orientation.

FIG. 2D illustrates a final state of the displayed output of the indication of angle of orientation relative to horizontal in response to detecting that the display device 100 is level via the graphical representation of the builder's level 212. As can be seen from FIG. 2D, the angle of orientation line 204 is no longer displayed on the display 104, and only the display of the horizontal line 202 and the builder's level 212 remains, to indicate that there is no angle of orientation relative to horizontal, and that the display device 100 is horizontally level. The bubble 214 is shown centered within the area 216 to further illustrate the angle of orientation relative to horizontal of the display device 100 is zero and that the display device 100 is horizontally level. As such, the user may visually detect a level orientation of the display device 100 in response to the iterative updating of the display 104 with the indication of the angle of orientation relative to horizontal of the television.

Figure 3A:
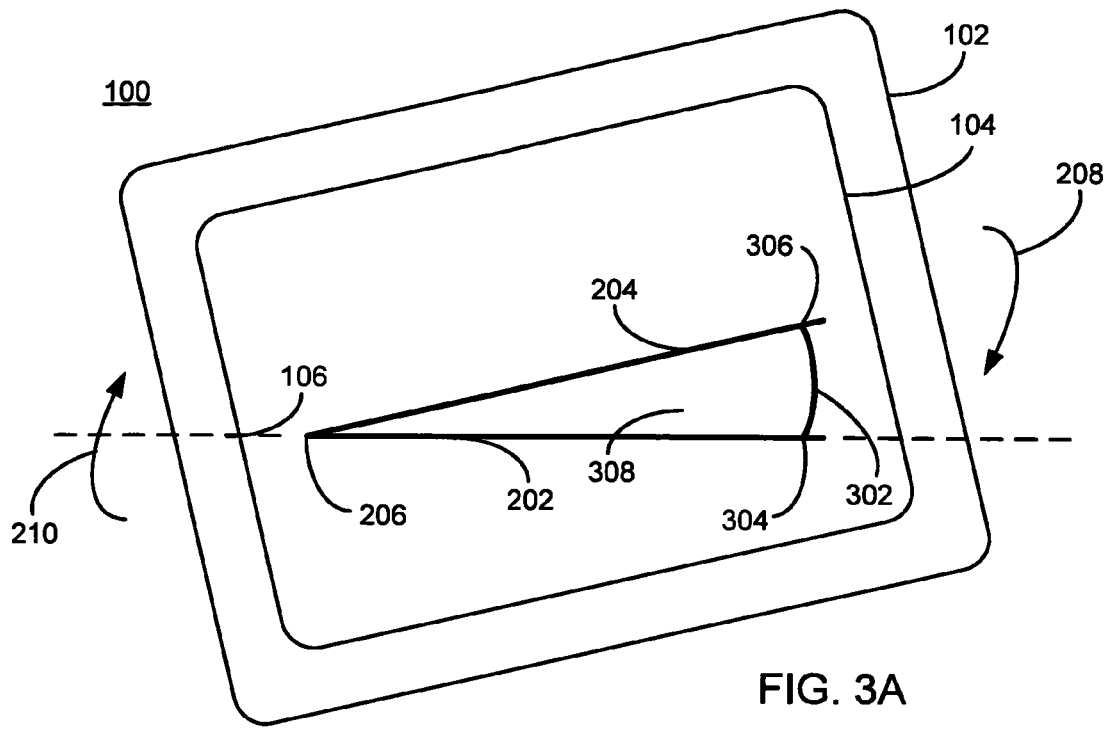
FIG. 3A is an illustration of an initial state of a display output for a third example of an implementation of a displayed indication of an angle of orientation relative to horizontal with a dynamic radius arc that dynamically changes in proportion to a detected angle of orientation of a display device consistent with certain embodiments of the present invention.
Figure 3B:
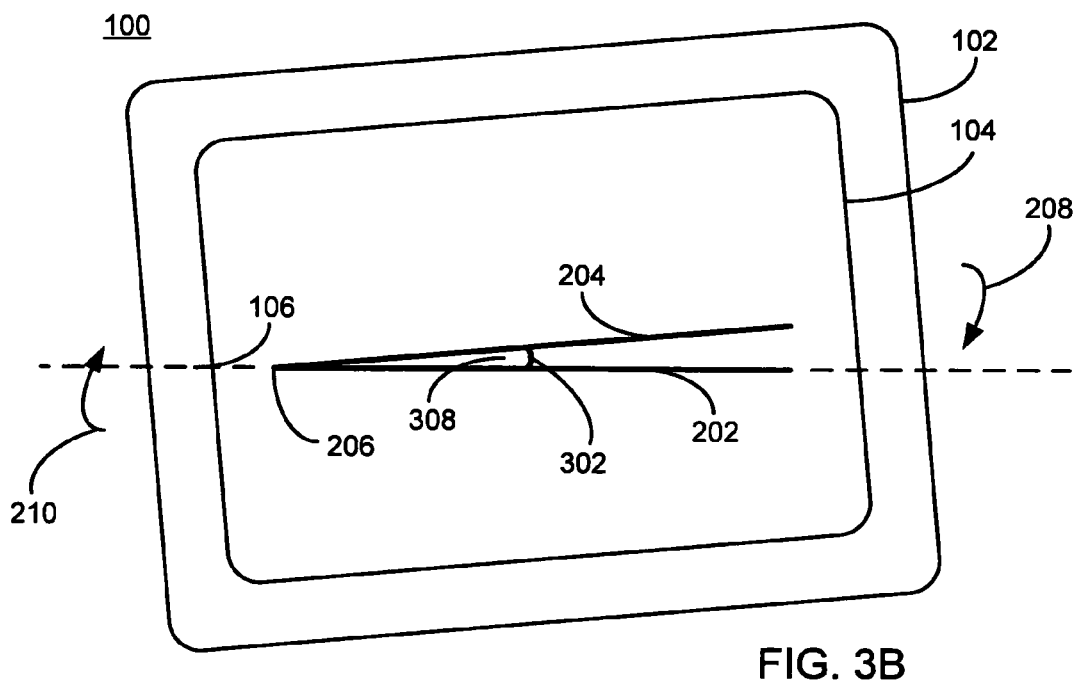
FIG. 3B is an illustration of a subsequent state of a display output for a third example of an implementation of a displayed indication of an angle of orientation relative to horizontal with a dynamic radius arc that dynamically changes in proportion to a detected angle of orientation of a display device consistent with certain embodiments of the present invention.

FIG. 3A and FIG. 3B illustrate display outputs for a third example of an implementation of a displayed indication of an angle of orientation relative to horizontal with a dynamic radius arc that dynamically changes in proportion to the detected angle of orientation of the display device 100. FIG. 3A illustrates an initial state that shows the display device 100 to be significantly out of level. It is understood that this orientation is for description purposes. The horizontal line 202 and the angle of orientation line 204 are again illustrated and intersect at a point of intersection 206 as described above in association with FIG. 2A through FIG. 2D. A radius arc 302 is shown on a right side of the display 104. The radius arc 302 terminates at the horizontal line 202 and the angle of orientation line 204 at points 304 and 306, respectively. An area 308 is enclosed by the horizontal line 202, the angle of orientation line 204, and the radius arc 302. As will be described in more detail below, the radius arc 302 may move dynamically along the horizontal line 202 and the angle of orientation line 204 relative to the point of intersection 206 in response to detected adjustments of the angle of orientation of the display device 100. Further, the area 308 may be filled with a color, shading, or otherwise changed in response to detected adjustments of the angle of orientation of the display device 100 to further enhance display of the indication of the angle of orientation relative to horizontal of the television. Additionally, that color may be changed as the angle of orientation of the display device 100 is changed.

FIG. 3B illustrates a subsequent state of the displayed output after a user has adjusted the display device 100 moderately clockwise. As can be seen from FIG. 3B, the radius arc 302 has moved to the left on the display 104 and provides an indication that the angle of orientation relative to horizontal of the display device 100 has been adjusted. Further, the area 308 enclosed by the horizontal line 202, the angle of orientation line 204, and the radius arc 302 is smaller to further indicate that the angle of orientation relative to horizontal of the display device 100 is smaller. The arrows 208 and 210 again illustrate a general direction of rotation of the display device 100 to achieve a level horizontal orientation, and are shown smaller for purposes of illustration.

As such, the example of FIG. 3A and FIG. 3B provides a dynamic radius arc that may be filled with color, shading, or otherwise changed to provide additional visual information to a user in response to detected adjustments of an angle of orientation of the television. The displayed output of the indication of the angle of orientation relative to horizontal of the display device 100 may be iteratively updated in response to detected adjustments of the angle of orientation. As with the example of FIG. 2A and FIG. 2B, upon detection of the angle of orientation indicating that the display device 100 is level, the displayed output may be represented as described above in association with FIG. 2B. This representation is not repeated within the sequence of FIG. 3A and FIG. 3B for brevity.

Figure 4A:
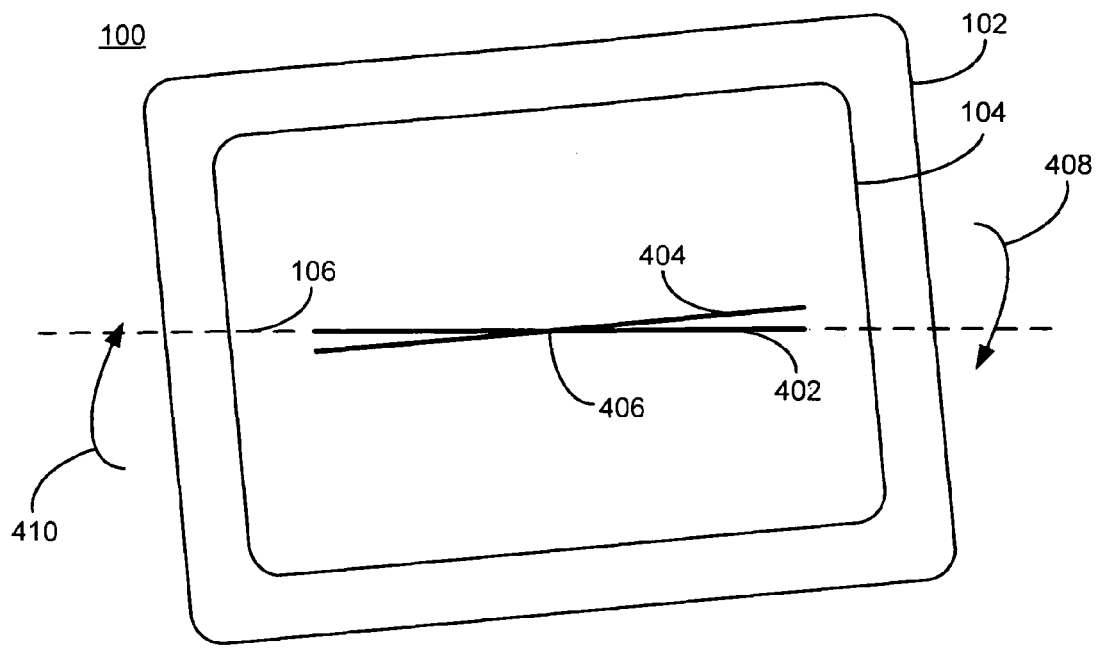
FIG. 4A is an illustration of an initial state of a display output for a fourth example of an implementation of display of an indication of an angle of orientation relative to horizontal on a television display using multiple complementary display angles consistent with certain embodiments of the present invention.
Figure 4B:
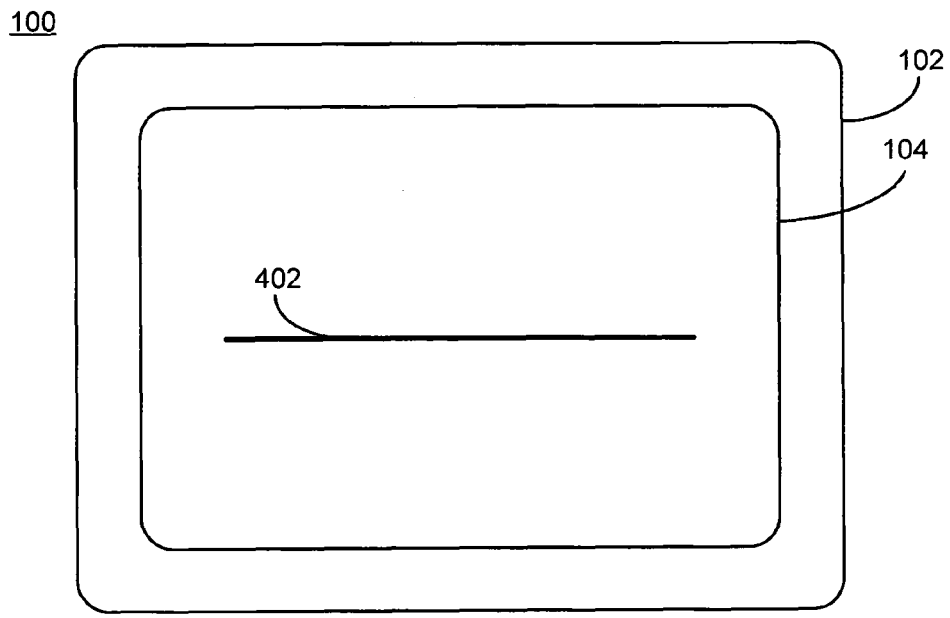
FIG. 4B is an illustration of a final state of a display output for a fourth example of an implementation of display of an indication of an angle of orientation relative to horizontal on a television display using multiple complementary display angles consistent with certain embodiments of the present invention.

FIG. 4A and FIG. 4B illustrate display outputs for a fourth example of an implementation of display of an indication of an angle of orientation relative to horizontal on a television display using multiple complementary display angles. FIG. 4A illustrates an initial state of the display device 100 after mounting in association with the horizontal level-adjustable mounting assembly. As can be seen from FIG. 4A, the display device 100 is out of level. A displayed horizontal line 402 is shown on the display 104. The displayed horizontal line 402 is coincident with the dashed horizontal line 106, shown in FIG. 1. An angle of orientation line 404 depicts an angle of orientation relative to the horizontal line 402.

As can be seen from FIG. 4A, the horizontal line 402 and the angle of orientation line 404 intersect at a point of intersection 406. Within the example of FIG. 4A, the point of intersection 406 represents a point of intersection where the horizontal line 402 and the angle of orientation line 404 cross on the display 104. Based upon the displayed output of the angle of orientation line 404 relative to the horizontal line 402, a user of the display device 100 may visually identify an indication of the angle of orientation relative to horizontal on the display 104. Further, the user may adjust the angle of orientation relative to horizontal of the display device 100 in response to the displayed indication of the angle of orientation relative to horizontal. As the user adjusts the display device 100, the display device 100 iteratively updates the display of the indication of the angle of orientation relative to horizontal of the television in response to detected adjustments of the angle of orientation. The arrows 408 and 410 are for illustration purposes only and show a general direction of rotation of the display device 100 to achieve a level horizontal orientation.

FIG. 4B illustrates a final state of the displayed output of the indication of angle of orientation relative to horizontal in response to detecting that the display device 100 is level. As can be seen from FIG. 4B, the angle of orientation line 404 is no longer displayed on the display 104, and only the display of the horizontal line 402 remains, to indicate that there is no angle of orientation relative to horizontal, and that the display device 100 is horizontally level. As such, the user may visually detect a level orientation of the display device 100 in response to the iterative updating of the display 104 with the indication of the angle of orientation relative to horizontal of the television.

Figure 5A:
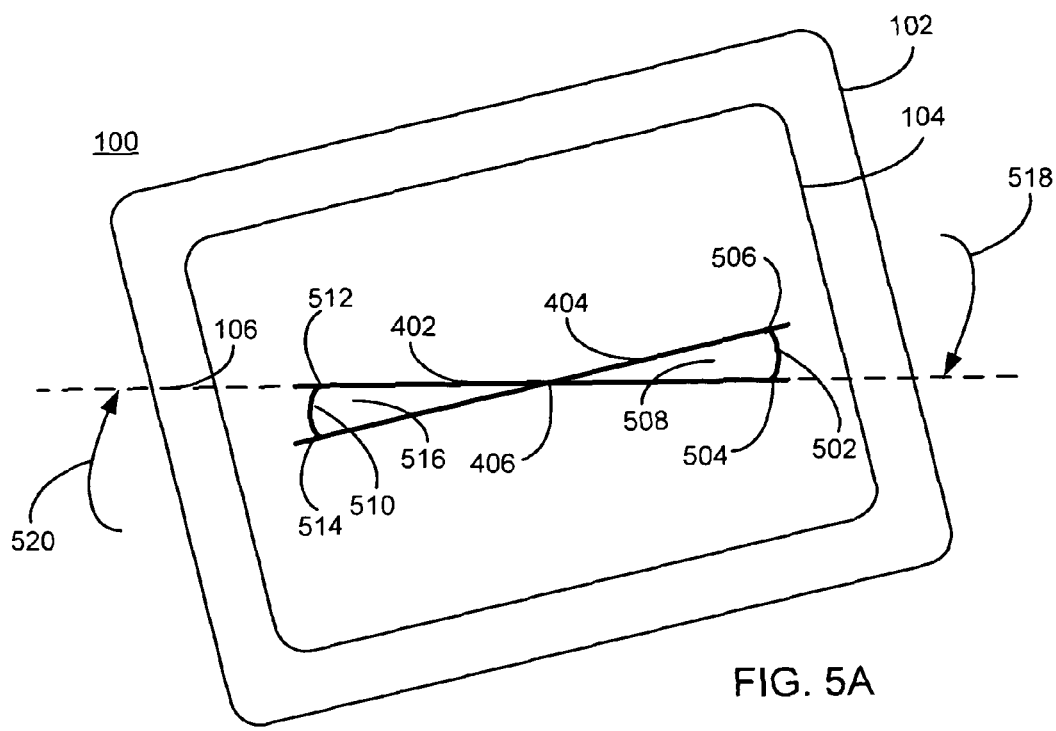
FIG. 5A is an illustration of an initial state of a display output for a fifth example of an implementation of a displayed indication of an angle of orientation relative to horizontal using multiple complementary display angles with dynamic radius arcs that dynamically change in proportion to the detected angle of orientation of the display device consistent with certain embodiments of the present invention.
Figure 5B:
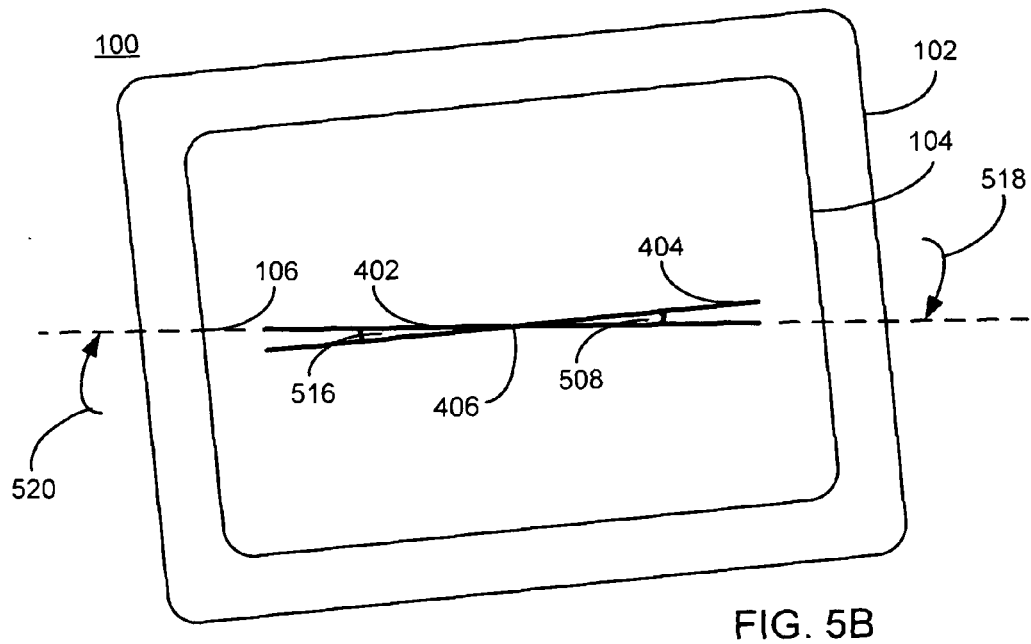
FIG. 5B is an illustration of a subsequent state of a display output for a fifth example of an implementation of a displayed indication of an angle of orientation relative to horizontal using multiple complementary display angles with dynamic radius arcs that dynamically change in proportion to the detected angle of orientation of the display device consistent with certain embodiments of the present invention.

FIG. 5A and FIG. 5B illustrate display outputs for a fifth example of an implementation of a displayed indication of an angle of orientation relative to horizontal using multiple complementary display angles with dynamic radius arcs that dynamically change in proportion to the detected angle of orientation of the display device 100. FIG. 5A illustrates an initial state that shows the display device 100 to be significantly out of level. It is understood that this orientation is for description purposes. The horizontal line 402 and the angle of orientation line 404 are again illustrated and intersect at a point of intersection 406 where the respective lines cross, as described above in association with FIG. 4A through FIG. 4B. A radius arc 502 is shown on a right side of the display 104. The radius arc 502 terminates at the horizontal line 402 and the angle of orientation line 404 at points 504 and 506, respectively. An area 508 is enclosed by the horizontal line 402, the angle of orientation line 404, and the radius arc 502. Similarly, a radius arc 510 is shown on a left side of the display 104. The radius arc 510 terminates at the horizontal line 402 and the angle of orientation line 404 at points 512 and 514, respectively. An area 516 is enclosed by the horizontal line 402, the angle of orientation line 404, and the radius arc 510. The arrows 518 and 520 are for illustration purposes only and show a general direction of rotation of the display device 100 to achieve a level horizontal orientation.

As will be described in more detail below, both the radius arc 502 and the radius arc 510 may move dynamically along the horizontal line 402 and the angle of orientation line 404 relative to the point of intersection 406 in response to detected adjustments of the angle of orientation of the display device 100. Further, the area 508 and the area 516 may be filled with a color, shading, or otherwise changed in response to detected adjustments of the angle of orientation of the display device 100 to further enhance display of the indication of the angle of orientation relative to horizontal of the television. Additionally, that color may be changed as the angle of orientation of the display device 100 is changed.

FIG. 5B illustrates a subsequent state of the displayed output after a user has adjusted the display device 100 moderately clockwise. Certain labels are omitted within FIG. 5B for ease of illustration. As can be seen from FIG. 5B, the radius arc 502 and the radius arc 510 have moved to the left and right, respectively, on the display 104 and provide an indication that the angle of orientation relative to horizontal of the display device 100 has been adjusted. Further, the area 508 and the area 516 are smaller to further indicate that the angle of orientation relative to horizontal of the display device 100 is smaller. The arrows 518 and 520 again illustrate a general direction of rotation of the display device 100 to achieve a level horizontal orientation, and are shown smaller for purposes of illustration.

As such, the example of FIG. 5A and FIG. 5B provides two dynamic radius arcs that may be filled with color, shading, or otherwise changed to provide additional visual information to a user in response to detected adjustments of an angle of orientation of the television. The displayed output of the indication of the angle of orientation relative to horizontal of the display device 100 may be iteratively updated in response to detected adjustments of the angle of orientation. As with the example of FIG. 4A and FIG. 4B above, upon detection of the angle of orientation indicating that the display device 100 is level, the displayed output may be represented as described above in association with FIG. 4B. This representation is not repeated within the sequence of FIG. 5A and FIG. 5B for brevity.

Figure 6:
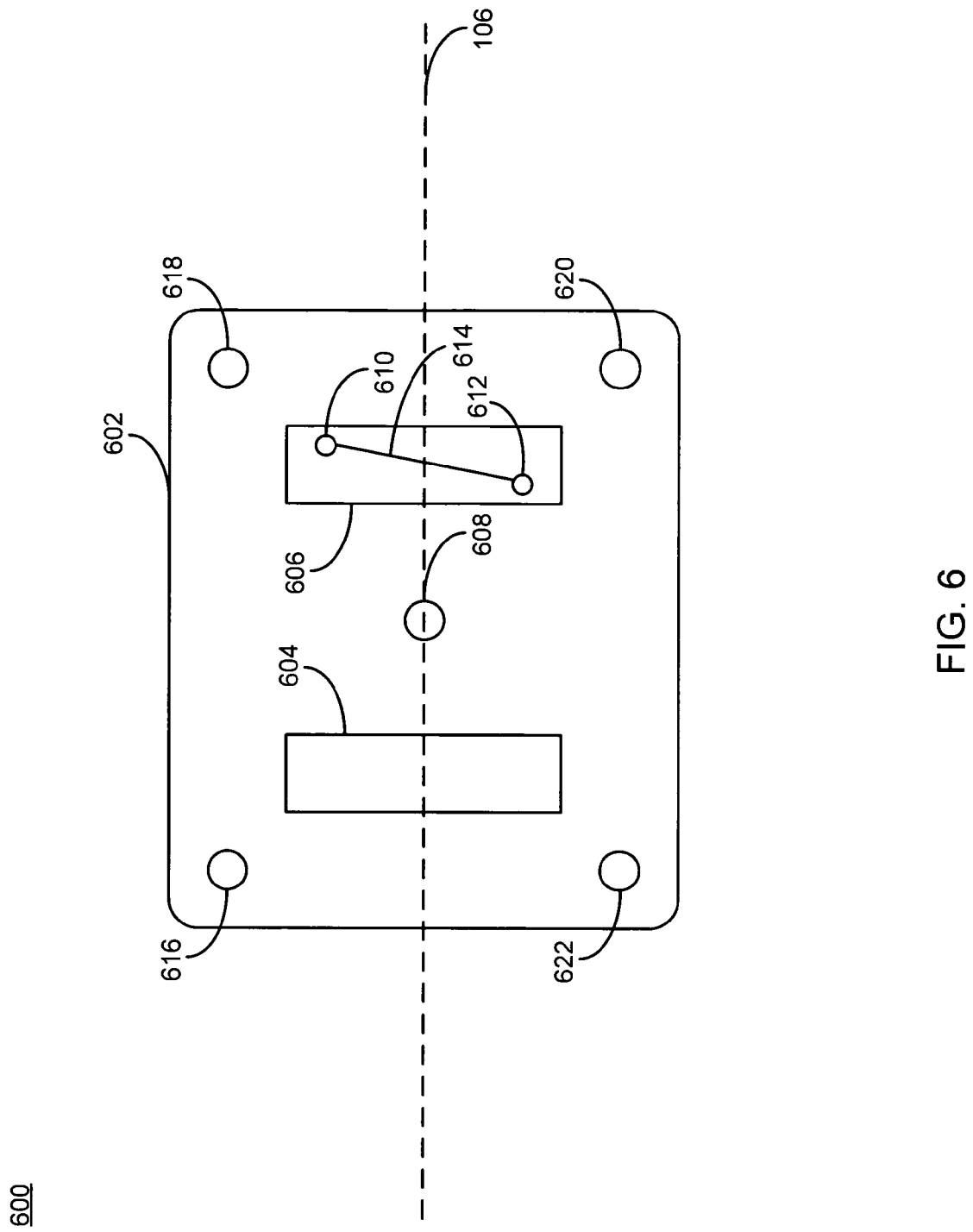
FIG. 6 is an illustration of an example of an implementation of a horizontal level-adjustable mounting assembly for television display leveling consistent with certain embodiments of the present invention.

FIG. 6 illustrates an example of an implementation of a horizontal level-adjustable mounting assembly 600 for television display leveling. Within the example of FIG. 6, the horizontal level-adjustable mounting assembly 600 is formed as a mounting plate 602 with television mounting members 604 and 606. For purposes of the present example, details of the television mounting members 602 and 604 are omitted for brevity. However, it is understood that any suitable fixtures for mounting a television or other display device to the mounting plate 602 may be used as appropriate for a given implementation.

Within the present example, a user may mount the mounting plate 602 at a center hole 608, and the mounting plate 602 may rotate relative to a fastener utilized within the center hole 608. It is understood that a user would typically locate a vertical framing member within a wall structure for a wall mount implementation, or the fastener attached at the center hole 608 may be fastened to a portion of a fixed ceiling attachment frame (not shown). It is further understood that any fastener appropriate for a given implementation may be used. Regardless of the implementation, upon completion of mounting the mounting plate 602 with a fastener via the center hole 608, the user may attach a display device, such as the display device 100, to the horizontal level-adjustable mounting assembly 600 via the member 604 and the member 606.

Within the present example, a conductor 610 and a conductor 612 are shown interconnected via a conductive line 614. The conductor 610 and the conductor 612 may interface with similar conductors on the display enclosure, such as the enclosure 102 (not shown). A moderate voltage, such as a voltage from a battery associated with the display device 100 may be applied to one of the conductors 610 and 612 within the display device 100. As such, when the television is mounted to the horizontal level-adjustable mounting assembly 600, that battery voltage may be conducted via the conductor 610, the conductive line 614, and the conductor 612 to an input sensing circuit within the display device 100. This input sensing circuit may activate a television leveling module, such as described in association with FIG. 7 below, to automatically activate the television display leveling functionality described herein. Alternatively, a momentary switch (not shown) may be placed on the enclosure 102 and operated by the user as appropriate for a given implementation.

The conductor 610 and the conductor 612 may be offset into different vertical planes where the coupling of the display device 100 to the horizontal level-adjustable mounting assembly 600 includes a sliding mechanical interconnection. Such a vertical offset may prevent the contacts of the display device from shorting to one another or applying the battery voltage to a conductor other than the intended conductor.

Many other possibilities exist for layout for such conductors and all are considered within the scope of the present subject matter.

As described above, the television display leveling described herein may iteratively determine whether the television associated with the horizontal level-adjustable mounting assembly 600 is presently level. In response to determining that the television is not level, the television display leveling described herein may iteratively begin prompting the user to adjust the mounting plate 602 relative to the horizontal line 106 as described above. In response to determining that the television is level based upon one or more level adjustments, the television leveling module may provide an indication of successful horizontal leveling of the television or display device 100 to the user via an audible or visual indication as described above.

In response to the indication of successful horizontal leveling of the display device 100, the user may mark a wall at the location of holes 616, 618, 620, and 622. The user may then remove the display device 100 from the horizontal level-adjustable mounting assembly 600 and install fasteners through the holes 616, 618, 620, and 622 to complete mounting of the horizontal level-adjustable mounting assembly 600 to the wall.

Alternatively, for a ceiling mount implementation where a fixed ceiling frame (not shown) is utilized, holes may be drilled at the marked locations or adjustable fasteners installed at the location of the holes 616, 618, 620, and 622 may be tightened to secure the mounting plate 602 in the horizontal orientation. Many other variations for horizontal level-adjustable mounting assemblies are possible and all are considered within the scope of the present subject matter.

Figure 7:
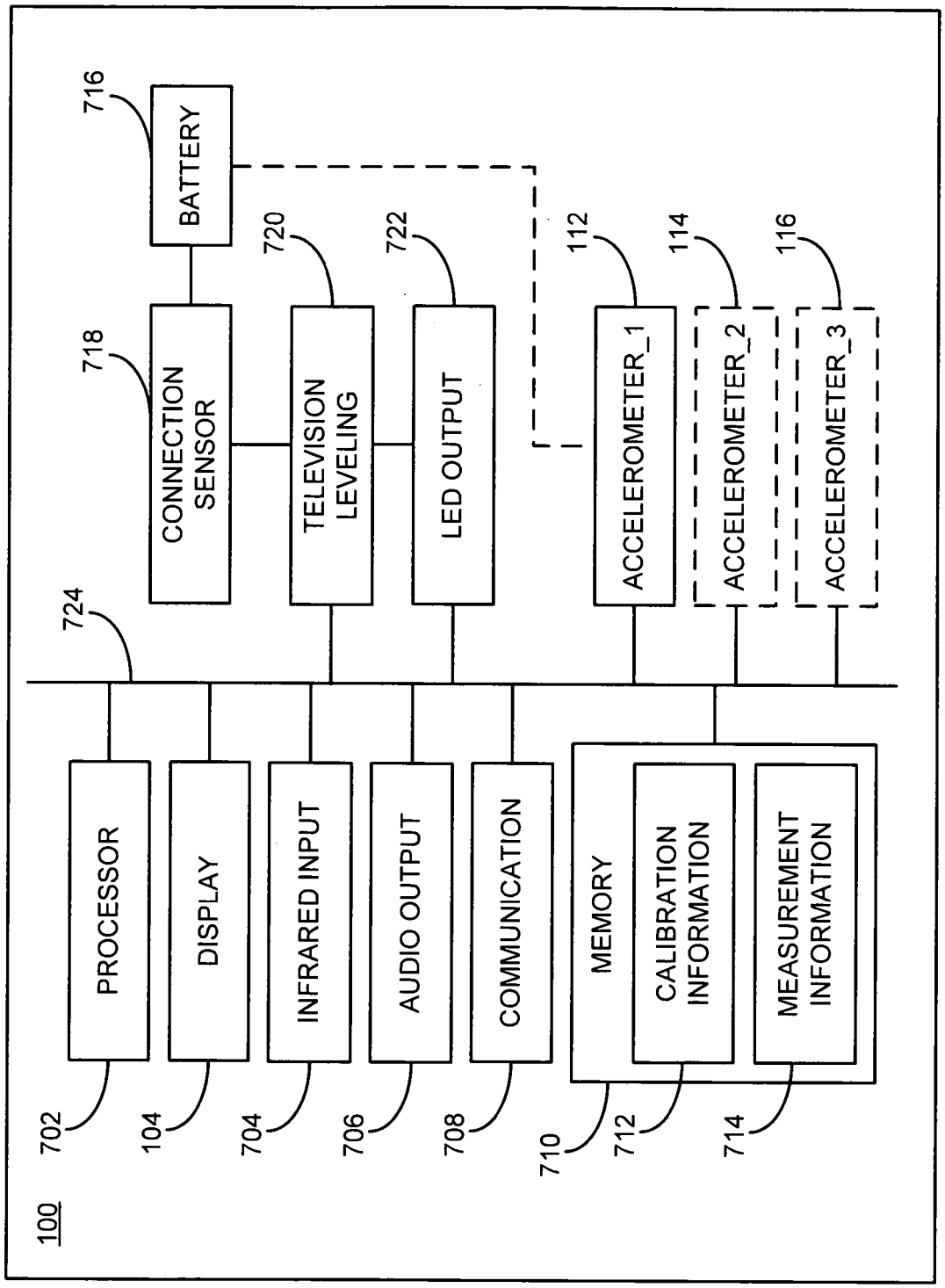
FIG. 7 is a block diagram of an example of an implementation of a display device that provides television display leveling consistent with certain embodiments of the present invention.

FIG. 7 is a block diagram of an example of an implementation of the display device 100 that provides television display leveling. A processor 702 provides computer instruction execution, computation, and other capabilities within the display device 100. The display 104, described above in association with FIG. 1, provides visual and/or other information to a user of the display device 100. The display 104 may include any type of display device, such as a cathode ray tube (CRT), liquid crystal display (LCD), light emitting diode (LED), projection or other display element or panel. An infrared input device 704 provides input capabilities for the user of the display device 100 via a device, such as an infrared remote control device (not shown).

An audio output device 706 provides audio output capabilities for the display device 100, such as verbal prompts, associated with display leveling. The audio output device 706 may include a speaker, driver circuitry, and interface circuitry as appropriate for a given implementation.

A communication module 708 provides communication capabilities for interaction with the display device 100, such as for retrieval of audio and video content via a satellite, cable, the Internet, or other content provider, and other activities as appropriate for a given implementation. The communication module 708 may support wired or wireless standards appropriate for a given implementation. Example wired standards include Internet video link (IVL) interconnection within a home network, for example. Example wireless standards include cellular wireless communication and Bluetooth® wireless communication standards. Many other wired and wireless communication standards are possible and all are considered within the scope of the present subject matter.

It should be noted that the communication module 708 is illustrated as a component-level module for ease of illustration and description purposes. It is also understood that the communication module 708 may include any hardware, programmed processor(s), and memory used to carry out the functions of the communication module 708. For example, the communication module 708 may include additional controller circuitry in the form of application specific integrated circuits (ASICs), processors, antenna(s), and/or discrete integrated circuits and components for performing electrical control activities associated with the communication module 708. Additionally, the communication module 708 may include interrupt-level, stack-level, and application-level modules as appropriate. Furthermore, the communication module 708 may include any memory components used for storage, execution, and data processing by these modules for performing processing activities associated with the communication module 708. The communication module 708 may also form a portion of other circuitry described below without departure from the scope of the present subject matter.

A memory 710 includes a calibration information storage area 712 and a measurement information storage area 714. The calibration information storage area 712 stores calibration information for one or more of the accelerometer_1 112, the accelerometer_2 114, and the accelerometer_3 116. The measurement information storage area 714 stores measurement information associated with horizontal level adjustments in association with the television display leveling described herein. As described above, the number and placement of accelerometers may differ as appropriate for a given implementation.

It should further be noted that calibration information for the accelerometer(s) may be initially stored within the calibration information storage area 712 at the factory. This factory-stored calibration information may be later modified based upon the level when user leveling is completed. That way, a change from the user's setup may be used to trigger a re-leveling query to the user as to whether he/she wishes to re-run the television display leveling described herein.

It is understood that the memory 710 may include any combination of volatile and non-volatile memory suitable for the intended purpose, distributed or localized as appropriate, and may include other memory segments not illustrated within the present example for ease of illustration purposes. For example, the memory 710 may include a code storage area, a code execution area, and a data area suitable for storage of the information and storage and execution of the respective applications and any firmware associated with a programmed processor that forms a portion of other components associated with the display device 100, as appropriate. It is also understood that other information may also be stored within the memory 710 as appropriate for a given implementation without departure from the scope of the present subject matter.

In certain implementations, a battery module 716 may be used to power both a connection sensor module 718 and a television leveling module 720. The battery module 716 may also power the infrared input module 704 as appropriate for a given implementation. The connection sensor module 718 provides driver circuitry and detection circuitry for connection of the display device 100 to a horizontal level-adjustable mounting assembly, such as the horizontal level-adjustable mounting assembly 600 described above, via the conductor pairs referenced within FIG. 6.

As also described above, and using the horizontal level-adjustable mounting assembly example of FIG. 6 for reference, the connection sensor module 718 may generate a voltage signal derived from a voltage source, such as a voltage generated from a voltage provided by the battery module 716, via the conductor 610. The connection sensor module 718 may then detect the generated voltage via the conductor 612 in response to connection of the display device 100 to the horizontal level-adjustable mounting assembly 600. As described above, the conductors 610 and 612 of the horizontal level-adjustable mounting assembly 600 may be offset into different vertical planes where the coupling of the display device 100 to the horizontal level-adjustable mounting assembly 600 includes a sliding mechanical interconnection.

The connection sensor module 718 may also provide an activation signal and/or control voltage applied to the television leveling module 720 to initiate action of the television leveling module 720 in response to detection of an interconnection of the display device 100 to a horizontal level-adjustable mounting assembly. The connection sensor module 718 may additionally or alternatively include circuitry to interface with a momentary switch (not shown) powered by the battery module 716 for manual user activation of the television leveling module 720.

The display device 100 also includes a light emitting diode (LED) output module 722. The LED output module 722 provides one or more output LEDs (e.g., an LED array) and associated driver circuitry for signaling certain events or acknowledgements to a user of the display device 100, such as for prompting the user during display leveling interactions. The LED output module 722 may alternatively or additionally be driven by the processor 702 as appropriate for a given implementation. Many possibilities exist for communicating information to a user via LED signaling and all are considered within the scope of the present subject matter.

The television leveling module 720 provides the television display leveling capabilities for the display device 100 associated with the present subject matter. As described in more detail below, the television leveling module 720 responds to either user-initiated requests to level the display device 100 or automatically initiates leveling interactions in response to activation, such as via the connection sensor module 718 as described above or by virtue of detecting a change from previously stored data that defines the television's mounted position.

It should be noted that the television leveling module 720 is illustrated as a component-level module for ease of illustration and description purposes. It is also understood that the television leveling module 720 may include any hardware, programmed processor(s), and memory used to carry out the functions of the television leveling module 720 as described above and in more detail below. For example, the television leveling module 720 may include additional controller circuitry in the form of application specific integrated circuits (ASICs), processors, and/or discrete integrated circuits and components for performing electrical control activities associated with the television leveling module 720. Additionally, the television leveling module 720 may include interrupt-level, stack-level, and application-level modules as appropriate. Furthermore, the television leveling module 720 may include any memory components used for storage, execution, and data processing for performing processing activities associated with the television leveling module 720.

It should be noted that the television leveling module 720 may also form a portion of other circuitry described below without departure from the scope of the present subject matter. Further, the television leveling module 720 may alternatively be implemented as an application stored within the memory 710. In such an implementation, the television leveling module 720 may include instructions executed by the processor 702 for performing the functionality described herein. The processor 702 may execute these instructions to provide the processing capabilities described above and in more detail below for the display device 100. The television leveling module 720 may form a portion of an interrupt service routine (ISR), a portion of an operating system, or a portion of a separate application without departure from the scope of the present subject matter.

As described above in association with FIG. 1, the display device 100 includes the accelerometer_1 112, the accelerometer_2 114, and the accelerometer_3 116. For purposes of the present description, it is understood that a single accelerometer, such as the accelerometer_1 112 may be implemented within the display device 100. The accelerometer_2 114 and accelerometer_3 116 are shown with dashed-line representations to illustrate that these may or may not be included as appropriate for a given implementation.

The processor 702, the display 104, the infrared input device 704, the audio output device 706, the communication module 708, the memory 710, the television leveling module 720, the LED output module 722, the accelerometer_1 112, the accelerometer_2 114, and the accelerometer_3 116 are interconnected via one or more interconnections shown as interconnection 724 for ease of illustration. The interconnection 724 may include a system bus, a network, or any other interconnection capable of providing the respective components with suitable interconnection for the respective purpose. Many other possible arrangements for the components of the display device 100 are possible and all are considered within the scope of the present subject matter.

Figure 8:
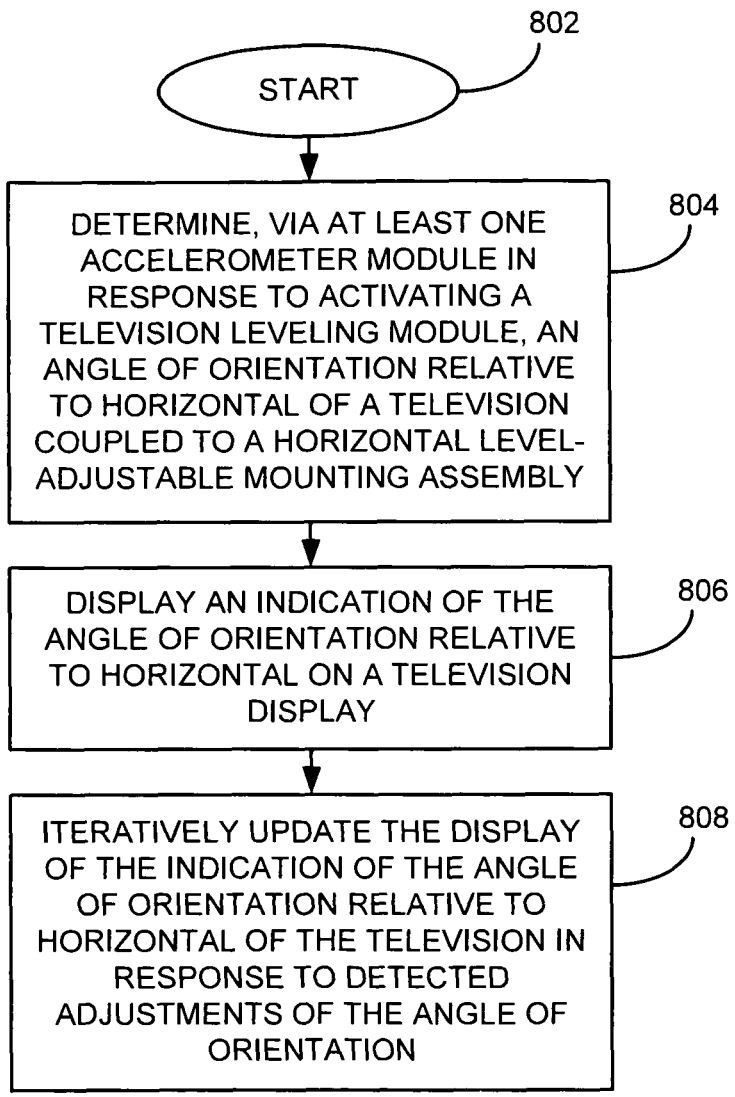
FIG. 8 is a flow chart of an example of an implementation of a process that provides television display leveling consistent with certain embodiments of the present invention.
Figure 9:
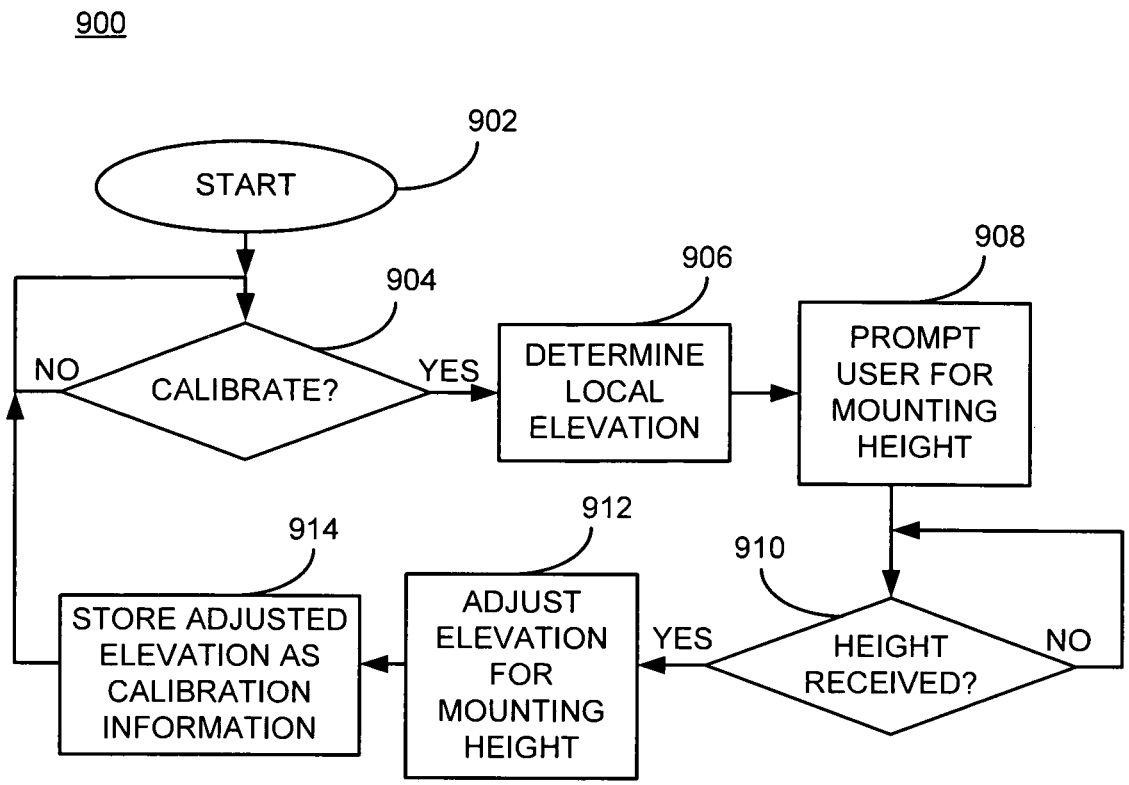
FIG. 9 is a flow chart of an example of an implementation of a process that provides calibration for accelerometers for television display leveling consistent with certain embodiments of the present invention.
Figure 10:
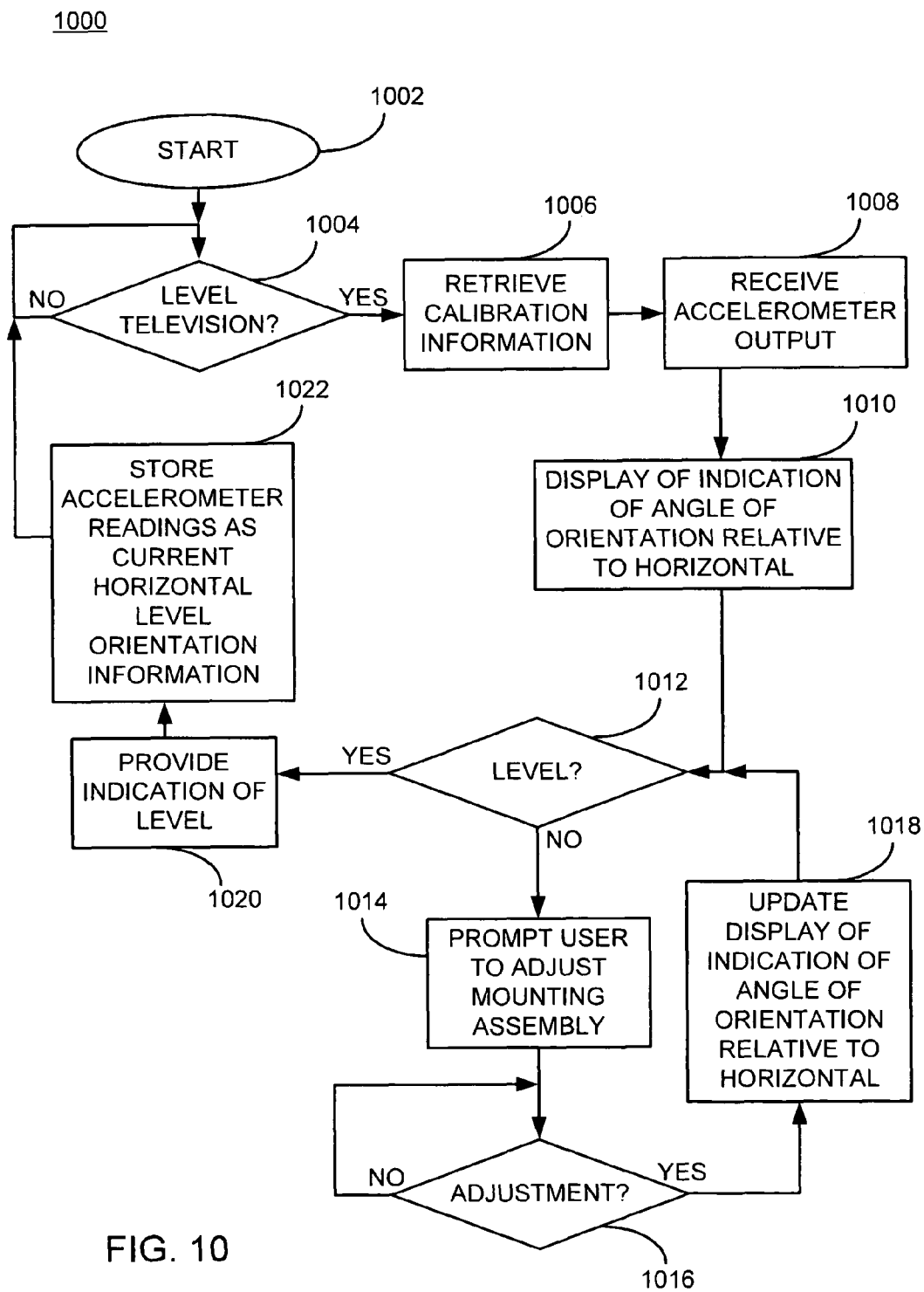
FIG. 10 is a flow chart of an example of an implementation of a process that provides television display leveling consistent with certain embodiments of the present invention.

FIG. 8 through FIG. 10 below describe example processes that may be executed by devices, such as the display device 100, to perform the television display leveling associated with the present subject matter. Many other variations on the example processes are possible and all are considered within the scope of the present subject matter. The example processes may be performed by modules, such as the television leveling module 720 and/or executed by the processor 702, associated with such devices. It should be noted that time out procedures and other error control procedures are not illustrated within the example processes described below for ease of illustration purposes. However, it is understood that all such procedures are considered to be within the scope of the present subject matter.

FIG. 8 is a flow chart of an example of an implementation of a process 800 that provides television display leveling. The process 800 starts at 802. Process 800 can start at 802 (as can any leveling process described herein) as a result of any suitable mechanism for initiating the start of a leveling process such as: initial power up of a new television set, determination that current level readings differ from prior level readings from the accelerometer(s) by more than a prescribed permissible error, determination that the current level readings differ from a stored calibration reading for level, user initiation by selection from a menu, or any other suitable start trigger. At block 804, the process 800 determines, via at least one accelerometer module in response to activating a television leveling module, an angle of orientation relative to horizontal of a television coupled to a horizontal level-adjustable mounting assembly. At block 806, the process 800 displays an indication of the angle of orientation relative to horizontal on a television display. At block 808, the process 800 iteratively updates the display of the indication of the angle of orientation relative to horizontal of the television in response to detected adjustments of the angle of orientation.

FIG. 9 is a flow chart of an example of an implementation of a process 900 that provides calibration for accelerometers for television display leveling. The process 900 starts at 902. At decision point 904, the process 900 makes a determination as to whether to calibrate one or more accelerometers, such as one or more of the accelerometer_1 112 through the accelerometer_3 116. In response to determining to calibrate one or more accelerometers, the process 900 determines a local elevation associated with a location at which the accelerometers are to be calibrated at block 906. A local elevation provides the calibration offset by which to process acceleration signals received from an accelerometer. The local elevation may be received, for example, by a physical address lookup via a website that provides local elevation information. The address lookup may be performed, for example, via the communication module 708 over an Internet connection. Alternatively, a user may be prompted to enter local elevation information or the local elevation information may be provided in a table stored in the calibration information storage area 712.

At block 908, the process 900 prompts a user for a mounting height associated with a mounting location of the television. Prompting the user for the mounting height may be performed audibly or visually, as described in association with other prompts above.

At decision point 910, the process 900 makes a determination as whether height input has been received. Height input may be received, for example, by user input via a remote control device (not shown). Alternatively, a momentary switch (also not shown), such as the one described above that may be associated with the connection sensor module 718, may be used and a user may sequentially depress the momentary switch to enter height information.

At block 912, the process 900 adjusts the elevation calibration information associated with each accelerometer based upon the mounting height of the television. At block 914, the process 900 stores the adjusted elevation calibration information as calibration information for each accelerometer module and returns to decision point 904 to await a new calibration request.

FIG. 10 is a flow chart of an example of an implementation of a process 1000 that provides television display leveling. The process 1000 starts at 1002. At decision point 1004, the process 1000 makes a determination as to whether a request to level a television has occurred. As described above, a request to level a television may be associated with a television leveling module, such as the television leveling module 720, and may be generated in response to a variety of events. Possible events include detecting mounting a television to a horizontal level-adjustable mounting assembly, user input, or other events as described above in connection with 802, for example.

In response to determining that a request to level a television has occurred, the process 1000 retrieves calibration information for accelerometers associated with the television at block 1006. At block 1008, the process 1000 receives accelerometer output signaling from each installed accelerometer. As described above, accelerometer output signaling may include signaling indicative of acceleration of an accelerometer in a direction opposite of an enclosure within which the accelerometer is mounted. At block 1010, the process 1000 displays an indication of an angle of orientation relative to horizontal on the display 104. As described above, if the display device 100 is level, the process 1000 may display, for example, a horizontal line. If the display device 100 is not level, the process 1000 may display an appropriate indication of the angle of orientation relative to horizontal on the display 104. The examples of FIG. 2A through FIG. 5B show several possibilities for display of an indication of the angle of orientation relative to horizontal. However, these examples are not to be considered limiting as other possibilities exist for display of an indication of the angle of orientation relative to horizontal, and all are considered within the scope of the present subject matter.

At decision point 1012, the process 1000 makes a determination as to whether the television is level based upon the accelerometer output signaling. In order to determine whether the television is level based upon accelerometer output signaling, the process 1000 may compare the retrieved accelerometer calibration information with acceleration measurement information associated with each accelerometer module. The process 1000 may further determine whether a difference exists between the accelerometer calibration information and the acceleration measurement information associated with the respective accelerometer modules.

As described above, one accelerometer module within the television may include a calibration reference accelerometer module mounted on an axis of rotation of a horizontal level-adjustable mounting assembly. An additional accelerometer may be mounted on a horizontal axis of the television that perpendicularly intersects the axis of rotation of the horizontal level-adjustable mounting assembly. In such an implementation, determining whether the television is level may include comparing accelerometer calibration information of the calibration reference accelerometer with the acceleration measurement information of the accelerometer module mounted on the horizontal axis of the television that perpendicularly intersects the axis of rotation of the horizontal level-adjustable mounting assembly. Many variations of accelerometer placement, measurement, comparison, and level determination are possible and all are considered within the scope of the present subject matter.

In response to determining at decision point 1012 that the television is not level, the process 1000 prompts a user to adjust the television via the horizontal level-adjustable mounting assembly at block 1014. As described above, the prompting may include audible or visual prompting via any output device appropriate for a given implementation. Alternatively, the prompting at block 1014 may be considered optional as the display of the indication of the angle of orientation relative to horizontal may prompt the user to adjust the horizontal angle of the display device 100 without further prompting at block 1014.

At decision point 1016, the process 1000 makes a determination as to whether a horizontal level adjustment of the television has been made. Detection of a horizontal level adjustment of the television may be made in response to signaling received from an installed accelerometer module as described herein. As such, the process 1000 may receive an indication from the accelerometer module that acceleration of the accelerometer module has been detected.

In response to determining that a horizontal level adjustment of the television has occurred at decision point 1016, the process 1000 updates display of the indication of the angle of orientation relative to horizontal at block 1018 and returns to decision point 1012 to make a determination as to whether the television is level. The process 1000 iterates in response to determining that the television is not level by updating display of the indication of the angle of orientation relative to horizontal of the television in response to detected adjustments of the angle of orientation. The process 1000 may alternatively prompt the user to further adjust the television via the horizontal level-adjustable mounting assembly and via detecting horizontal level adjustments as described above until a determination is made that the television is level based upon an indication of a horizontal level adjustment.

It should further be understood that it may be advantageous to allow a user to override the leveling and select a horizontal orientation other than truly level. For example, if a floor of a room is unlevel, a user may wish to adjust the television to align with the unlevel floor so that the television is square with elements in the room rather than truly level. As such, the determination at decision point 1012 may be made in response to either an automated determination that the television is level or in response to user input to specify the current orientation as level for purposes of level information storage.

In response to determining that the television is level at decision point 1012, the process 1000 provides an indication of successful horizontal leveling of the television to the user at block 1020. As described above, the indication of successful horizontal leveling of the television may include generating a visual output or an audible output, as appropriate for the given implementation. As described above, if the display device 100 is level, the process 1000 may display, for example, a horizontal line. Many other possibilities exist for display of an indication of the angle of orientation relative to horizontal, and/or that the display device 100 is level, and all are considered within the scope of the present subject matter.

At block 1022, the process 1000 stores the accelerometer readings as current leveling information associated with the current horizontal level orientation of the television. The current leveling information may be used, for example, for additional processing in response to determining whether a subsequent mechanical impact to the television has occurred that results in a change to the horizontal level orientation of the television. As such, the processing for detection of a horizontal level change associated with the television may also be performed to detect impacts to the mounted television. Activation of a television leveling module, such as the television leveling module 720, may be performed in response to such a detection and processing as described above in association with the process 1000 may again be performed to re-level the television.

In should be noted that in certain implementations, such as described above where a floor may not be level, it may also be advantageous to allow selection between the calibration information and the stored level information for performance of a leveling operation. As such, the original factory calibration information may be retained to allow for selection of the original factory calibration information and the accelerometer readings stored at block 1022 as current leveling information may alternatively be associated with the current horizontal level orientation of the television rather than a true horizontal orientation of the television.

In response to completion of storing the accelerometer readings as current horizontal level orientation information at block 1022, the process 1000 returns to decision point 1004 to await a new activation event.

As such, the process 1000 responds to activation events for a television leveling module, retrieves calibration information, and iteratively prompts a user to adjust a television via a horizontal level-adjustable mounting assembly until the television is level. The process 1000 provides an indication of successful horizontal leveling and stores accelerometer readings for use in response to subsequent events, such as a change in horizontal leveling of the television that may occur over time or in response to a physical impact.

Thus, in accord with certain implementations, a method of leveling a television involves receiving accelerometer calibration information and acceleration measurement information associated with at least one accelerometer module; comparing the accelerometer calibration information with the acceleration measurement information associated with the at least one accelerometer module; determining that a difference exists between the accelerometer calibration information and the acceleration measurement information associated with the at least one accelerometer module; determining, via the at least one accelerometer module in response to activating a television leveling module, an angle of orientation relative to horizontal of a television coupled to a horizontal level-adjustable mounting assembly based upon a magnitude of the difference between the accelerometer calibration information and the acceleration measurement information associated with the at least one accelerometer module; displaying an indication of the angle of orientation relative to horizontal on a television display, where the indication of the angle of orientation relative to horizontal includes a first line intersecting with a second line at a point of intersection on the television display, where an angle of the second line relative to the first line forms the angle of orientation relative to horizontal; and iteratively updating the display of the indication of the angle of orientation relative to horizontal of the television in response to detected adjustments of the angle of orientation.

In another implementation, a method of leveling a television involves determining, via at least one accelerometer module in response to activating a television leveling module, an angle of orientation relative to horizontal of a television coupled to a horizontal level-adjustable mounting assembly; displaying an indication of the angle of orientation relative to horizontal on a television display; and iteratively updating the display of the indication of the angle of orientation relative to horizontal of the television in response to detected adjustments of the angle of orientation.

In certain implementations, the method of leveling a television further involves receiving accelerometer calibration information and acceleration measurement information associated with the at least one accelerometer module; comparing the accelerometer calibration information with the acceleration measurement information associated with the at least one accelerometer module; and determining that a difference exists between the accelerometer calibration information and the acceleration measurement information associated with the at least one accelerometer module. In certain implementations, the method of determining, via the at least one accelerometer module in response to activating the television leveling module, the angle of orientation relative to horizontal of the television coupled to the horizontal level-adjustable mounting assembly involves determining the angle of orientation relative to horizontal of the television based upon a magnitude of the difference between the accelerometer calibration information and the acceleration measurement information associated with the at least one accelerometer module. In certain implementations, the method of displaying the indication of the angle of orientation relative to horizontal on the television display involves displaying a first line intersecting with a second line at a point of intersection on the television display, where an angle of the second line relative to the first line forms the angle of orientation relative to horizontal. In certain implementations, the method further involves displaying the first line on the television display in a horizontal orientation; and displaying the second line on the television display at the angle of orientation relative to horizontal. In certain implementations, the method further involves detecting a first adjustment of the angle of orientation relative to horizontal of the television to a new angle of orientation relative to horizontal of the television; and the method of iteratively updating the display of the indication of the angle of orientation relative to horizontal of the television in response to detected adjustments of the angle of orientation involves determining, via the at least one accelerometer module, the new angle of orientation relative to horizontal of the television; and adjusting the display of the second line to indicate the new angle relative to the first line and relative to the point of intersection in response to detecting the first adjustment of the angle of orientation relative to horizontal of the television to the new angle. In certain implementations, the method of displaying the first line intersecting with the second line at the point of intersection on the television display involves displaying the first line and the second line as intersecting at a point of terminus of each of the first line and the second line on the television display. In certain implementations, the method further involves displaying a radius arc relative to the point of terminus extending from the first line to the second line. In certain implementations, the method further involves filling an area enclosed between the first line, the second line, and the radius arc with a color. In certain implementations, the method of displaying the first line intersecting with the second line at the point of intersection on the television display involves displaying the first line and the second line as crossing at a point of intersection. In certain implementations, the method further involves displaying a first radius arc relative to the point of intersection extending from the first line to the second line to a left side of the point of intersection; and displaying a second radius arc relative to the point of intersection extending from the first line to the second line to a right side of the point of intersection. In certain implementations, the method further involves filling an area enclosed between the first line, the second line, and the first radius arc with a color; and filling an area enclosed between the first line, the second line, and the second radius arc with the color. In certain implementations, the method further involves determining that the angle of orientation relative to horizontal of the television is zero; and terminating the display of the indication of the angle of orientation relative to horizontal of the television in response to determining that the angle of orientation relative to horizontal of the television is zero. In certain implementations, the method further involves saving acceleration measurement information associated with the at least one accelerometer module as accelerometer calibration information for the at least one accelerometer module. In certain implementations, the method further involves detecting a consumer power on activation of the television; comparing the accelerometer calibration information with acceleration measurement information associated with the at least one accelerometer module; and activating the television leveling module automatically in response to determining that a difference exists between the accelerometer calibration information and the acceleration measurement information associated with the at least one accelerometer module. In certain implementations, the method further involves detecting an initial consumer power on activation of the television; and activating the television leveling module automatically in response to detecting the initial consumer power on activation of the television. In certain implementations, the method further involves detecting movement of the television; and activating the television leveling module in response to detecting the movement of the television. In certain implementations, the method further involves periodically comparing accelerometer calibration information with acceleration measurement information associated with the at least one accelerometer module; and activating the television leveling module automatically in response to determining that a difference exists between the accelerometer calibration information and the acceleration measurement information associated with the at least one accelerometer module. In certain implementations, the method further involves detecting a request to activate the television leveling module via a menuing system of the television; and activating the television leveling module in response to detecting the request to activate the television leveling module.

In another implementation, a computer readable storage medium may store instructions which, when executed on one or more programmed processors, carry out a method of determining, via at least one accelerometer module in response to activating a television leveling module, an angle of orientation relative to horizontal of a television coupled to a horizontal level-adjustable mounting assembly; displaying an indication of the angle of orientation relative to horizontal on a television display; and iteratively updating the display of the indication of the angle of orientation relative to horizontal of the television in response to detected adjustments of the angle of orientation.

A television device associated with a horizontal level-adjustable mounting assembly consistent with certain implementations has at least one accelerometer module; a display; and a processor programmed to determine, via the at least one accelerometer module in response to activating a television leveling module, an angle of orientation relative to horizontal of the television coupled to the horizontal level-adjustable mounting assembly; display an indication of the angle of orientation relative to horizontal on the display; and iteratively update the display of the indication of the angle of orientation relative to horizontal of the television on the display in response to detected adjustments of the angle of orientation.

In certain implementations, the processor is further programmed to receive accelerometer calibration information and acceleration measurement information associated with the at least one accelerometer module; compare the accelerometer calibration information with the acceleration measurement information associated with the at least one accelerometer module; and determine that a difference exists between the accelerometer calibration information and the acceleration measurement information associated with the at least one accelerometer module. In certain implementations, in being programmed to determine, via the at least one accelerometer module in response to activating the television leveling module, the angle of orientation relative to horizontal of the television coupled to the horizontal level-adjustable mounting assembly, the processor is programmed to determine the angle of orientation relative to horizontal of the television based upon a magnitude of the difference between the accelerometer calibration information and the acceleration measurement information associated with the at least one accelerometer module. In certain implementations, in being programmed to display the indication of the angle of orientation relative to horizontal on the display, the processor is programmed to display a first line intersecting with a second line at a point of intersection on the display, where an angle of the second line relative to the first line forms the angle of orientation relative to horizontal. In certain implementations, the processor is further programmed to display the first line on the display in a horizontal orientation; and display the second line on the display at the angle of orientation relative to horizontal. In certain implementations, the processor is further programmed to detect a first adjustment of the angle of orientation relative to horizontal of the television to a new angle of orientation relative to horizontal of the television; and in being programmed to iteratively update the display of the indication of the angle of orientation relative to horizontal of the television on the display in response to detected adjustments of the angle of orientation, the processor is programmed to determine, via the at least one accelerometer module, the new angle of orientation relative to horizontal of the television; and adjust the display of the second line to indicate the new angle relative to the first line and relative to the point of intersection in response to detecting the first adjustment of the angle of orientation relative to horizontal of the television to the new angle. In certain implementations, in being programmed to display the first line intersecting with the second line at the point of intersection on the display, the processor is programmed to display the first line and the second line as intersecting at a point of terminus of each of the first line and the second line on the display. In certain implementations, the processor is further programmed to display a radius arc relative to the point of terminus extending from the first line to the second line on the display. In certain implementations, the processor is further programmed to fill an area enclosed between the first line, the second line, and the radius arc with a color. In certain implementations, in being programmed to display the first line intersecting with the second line at the point of intersection on the display, the processor is programmed to display the first line and the second line as crossing at a point of intersection on the display. In certain implementations, the processor is further programmed to display a first radius arc relative to the point of intersection extending from the first line to the second line to a left side of the point of intersection on the display; and display a second radius arc relative to the point of intersection extending from the first line to the second line to a right side of the point of intersection on the display. In certain implementations, the processor is further programmed to fill an area enclosed between the first line, the second line, and the first radius arc with a color; and fill an area enclosed between the first line, the second line, and the second radius arc with the color. In certain implementations, the processor is further programmed to determine that the angle of orientation relative to horizontal of the television is zero; and terminate the display of the indication of the angle of orientation relative to horizontal of the television on the display in response to determining that the angle of orientation relative to horizontal of the television is zero. In certain implementations, the processor is further programmed to save acceleration measurement information associated with the at least one accelerometer module as accelerometer calibration information for the at least one accelerometer module. In certain implementations, the processor is further programmed to detect a consumer power on activation of the television; compare the accelerometer calibration information with acceleration measurement information associated with the at least one accelerometer module; and activate the television leveling module automatically in response to determining that a difference exists between the accelerometer calibration information and the acceleration measurement information associated with the at least one accelerometer module. In certain implementations, the processor is further programmed to detect an initial consumer power on activation of the television; and activate the television leveling module automatically in response to detecting the initial consumer power on activation of the television. In certain implementations, the processor is further programmed to detect movement of the television; and activate the television leveling module in response to detecting the movement of the television. In certain implementations, the processor is further programmed to periodically compare accelerometer calibration information with acceleration measurement information associated with the at least one accelerometer module; and activate the television leveling module automatically in response to determining that a difference exists between the accelerometer calibration information and the acceleration measurement information associated with the at least one accelerometer module. In certain implementations, the processor is further programmed to detect a request to activate the television leveling module via a menuing system of the television; and activate the television leveling module in response to detecting the request to activate the television leveling module.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of leveling a television, comprising:
receiving accelerometer calibration information from a first accelerometer module mounted on an axis of rotation of a horizontal level-adjustable mounting assembly coupled to the television;
receiving acceleration measurement information from a second accelerometer module mounted on a horizontal axis of the television that perpendicularly intersects the axis of rotation of the horizontal level-adjustable mounting assembly;
comparing the received accelerometer calibration information with the received acceleration measurement information;
determining a difference between the received accelerometer calibration information and the received acceleration measurement information;
determining, in response to activating a television leveling module, an angle of orientation relative to the horizontal axis of the television, wherein the angle of orientation is determined based upon a magnitude of the calculated difference;

displaying an indication of the determined angle of orientation relative to the horizontal axis of the television; and
iteratively updating the displayed indication of the angle of orientation in response to adjustment of the horizontal level-adjustable mounting assembly coupled to the television.

2. The method of claim 1, wherein the television leveling module is activated in response to detection of a change in voltage across a momentary switch associated with the television.

3. A method of claim 1, wherein the television leveling module is activated in response to detection of contact between a first set of conductors associated with the horizontal level-adjustable mounting assembly coupled to the television and a second set of conductors associated with the television.

4. A method of leveling a television, comprising:
determining, via at least one accelerometer module in response to activating a television leveling module, an angle of orientation relative to a horizontal level plane, wherein the television is coupled to a horizontal level-adjustable mounting assembly, wherein the television leveling module is activated in response to detection of contact between a first set of conductors associated with the horizontal level-adjustable mounting assembly and a second set of conductors associated with the television;
displaying an indication of the determined angle of orientation relative to the horizontal level plane on a television display; and
iteratively updating the displayed indication of the angle of orientation relative to the horizontal level plane in response to adjustments of the horizontal level-adjustable mounting assembly coupled to the television.

5. The method according to claim 4, further comprising:
receiving accelerometer calibration information from a first accelerometer module mounted on an axis of rotation of the horizontal level-adjustable mounting assembly coupled to the television;
receiving acceleration measurement information from a second accelerometer module mounted on a horizontal axis of the television that perpendicularly intersects the axis of rotation of the horizontal level-adjustable mounting assembly;
comparing the received accelerometer calibration information with the received acceleration measurement information; and determining a difference between the received accelerometer calibration information and the received acceleration measurement information.

6. The method according to claim 5, wherein determining the angle of orientation relative to the horizontal level plane comprises:
determining the angle of orientation relative to the horizontal level plane based upon a magnitude of the difference between the received accelerometer calibration information and the received acceleration measurement information.

7. The method according to claim 5, wherein displaying the indication of the determined angle of orientation relative to the horizontal level plane on the television display comprises displaying a first line intersecting a second line at a point of intersection on the television display, wherein an angle of the second line relative to the first line forms the angle of orientation.

8. The method according to claim 7, further comprising:
displaying the first line on the television display coincident with the horizontal level plane; and
displaying the second line on the television display at the angle of orientation relative to horizontal level plane.

9. The method according to claim 8, further comprising:
detecting a first adjustment of the angle of orientation relative to the horizontal level plane to a new angle of orientation relative to the horizontal level plane; and
iteratively updating the displayed indication of the angle of orientation relative to the horizontal level plane in response to the detected first adjustment of the angle of orientation,
wherein the iterative updating of the displayed indication comprises:
determining the new angle of orientation relative to the horizontal level plane; and
adjusting the display of the second line to indicate the new angle of orientation relative to the first line in response to detecting the first adjustment of the angle of orientation.

10. The method according to claim 9, wherein displaying the indication of the angle of orientation comprises displaying the first line and the second line as intersecting at a point of terminus of each of the first line and the second line on the television display.

11. The method according to claim 10, further comprising displaying a radius arc relative to the point of terminus extending from the first line to the second line.

12. The method according to claim 11, further comprising filling an area enclosed between the first line, the second line, and the radius arc with a color.

13. The method according to claim 11, wherein the first line and the second line are displayed as crossing at the point of intersection.

14. The method according to claim 13, further comprising:
displaying a first radius arc relative to the point of intersection extending from the first line to the second line to a left side of the point of intersection; and
displaying a second radius arc relative to the point of intersection extending from the first line to the second line to a right side of the point of intersection.

15. The method according to claim 14, further comprising:
filling an area enclosed between the first line, the second line, and the first radius arc with a color; and
filling an area enclosed between the first line, the second line, and the second radius arc with the color.

16. The method according to claim 4, further comprising terminating the display of the indication of the angle of orientation relative to the horizontal level plane in response to determining that the angle of orientation relative to the horizontal level plane is zero.

17. The method of claim 4, further comprising:
comparing accelerometer calibration information received from a first accelerometer module mounted on an axis of rotation of the horizontal level-adjustable mounting assembly coupled to the television with acceleration measurement information received from a second accelerometer module mounted on a horizontal axis of the television that perpendicularly intersects the axis of rotation of the horizontal level-adjustable mounting assembly; and
activating the television leveling module automatically in response to determining a difference between the accelerometer calibration information and the acceleration measurement information.

18. The method according to claim 4, further comprising:
detecting an initial consumer power on activation of the television; and activating the television leveling module automatically in response to detecting the initial consumer power on activation of the television.

19. The method according to claim 4, further comprising:
   detecting a movement of the television; and
   activating the television leveling module in response to detecting the movement of the television.

20. The method according to claim 4, further comprising:
   detecting a request to activate the television leveling module via a menu system of the television; and
   activating the television leveling module in response to detecting the request to activate the television leveling module.

21. A non-transitory computer-readable storage medium having stored thereon, a computer program having at least one code section for leveling a television, the at least one code section being executable by a processor for causing the processor to perform steps comprising:
   determining, via at least one accelerometer module in response to activating a television leveling module, an angle of orientation relative to a horizontal level plane, wherein the television is coupled to a horizontal level-adjustable mounting assembly, wherein the television leveling module is activated in response to detection of contact between a first set of conductors associated with the horizontal level-adjustable mounting assembly coupled to the television and a second set of conductors associated with the television;
   displaying an indication of the determined angle of orientation relative to the horizontal level plane; and
   iteratively updating the displayed angle of orientation relative to the horizontal level plane in response to adjustments of the horizontal level-adjustable mounting assembly coupled to the television.

22. The method of claim 4, wherein the television leveling module is activated in response to detection of a change in voltage across a momentary switch associated with the television.

23. A television comprising:
   at least one accelerometer module;
   a display; and
   a processor operable to:
   determine in response to activating a television leveling module, an angle of orientation relative to a horizontal level plane, wherein the television is coupled to a horizontal level-adjustable mounting assembly, wherein the television leveling module is activated in response to detection of contact between a first set of conductors associated with the horizontal level-adjustable mounting assembly and a second set of conductors associated with the television;
   display an indication of the angle of orientation relative to the horizontal level plane on a television display; and
   iteratively update the displayed indication of the angle of orientation relative to the horizontal level plane in response to adjustments of the horizontal level-adjustable mounting assembly coupled to the television.

24. The television according to claim 23, wherein the processor is further operable to:
   receive accelerometer calibration information from a first accelerometer module mounted on an axis of rotation of the horizontal level-adjustable mounting assembly coupled to the television;
   receive acceleration measurement information from a second accelerometer module mounted on a horizontal axis of the television that perpendicularly intersects the axis of rotation of the horizontal level-adjustable mounting assembly;
   compare the received accelerometer calibration information with the received acceleration measurement information; and
   determine a difference between the received accelerometer calibration information and the received acceleration measurement information.

25. The television according to claim 24,
   wherein the angle of orientation relative to the horizontal level plane is determined based upon a magnitude of the difference between the received accelerometer calibration information and the received acceleration measurement information.

26. The television according to claim 23, wherein the processor is operable to display the indication of the angle of orientation as a first line intersecting a second line at a point of intersection on the television display, wherein an angle of the second line relative to the first line forms the angle of orientation.

27. The television according to claim 26, wherein the processor is further operable to:
   display the first line on the television display coincident with the horizontal level plane; and
   display the second line on the television display at the angle of orientation relative to horizontal level plane.

28. The television according to claim 27, wherein the processor is further operable to:
   detect a first adjustment of the angle of orientation relative to horizontal level plane to a new angle of orientation relative to the horizontal level plane; and
   iteratively update the displayed indication of the angle of orientation relative to the horizontal level plane in response to the detected first adjustment of the angle of orientation, wherein the iterative updating of the displayed indication comprises:
   determine the new angle of orientation relative to the horizontal level plane; and
   adjust the display of the second line to indicate the new angle of orientation relative to the first line in response to detecting the first adjustment of the angle of orientation.

29. The television according to claim 28, wherein the processor is operable to display the indication of the angle of orientation comprising the first line intersecting the second line at a point of terminus of each of the first line and the second line on the television display.

30. The television according to claim 29, wherein the processor is further operable to display a radius arc relative to the point of terminus extending from the first line to the second line on the television display.

31. The television according to claim 30, wherein the processor is further operable to fill an area enclosed between the first line, the second line, and the radius arc with a color.

32. The television according to claim 30, wherein the processor is operable to display the indication of the angle of orientation comprising first line and the second line crossing at a point of intersection on the television display.

33. The television according to claim 32, wherein the processor is further operable to:
   display a first radius arc relative to the point of intersection extending from the first line to the second line to a left side of the point of intersection on the television display; and display a second radius arc relative to the point of intersection extending from the first line to the second line to a right side of the point of intersection on the television display.

34. The television according to claim 33, wherein the processor is further operable to:
fill an area enclosed between the first line, the second line, and the first radius arc with a color; and
fill an area enclosed between the first line, the second line, and the second radius arc with the color.

35. The television according to claim 23, wherein the processor is further operable to:
terminate the display of the indication of the angle of orientation relative to the horizontal level plane in response to determining that the angle of orientation relative to the horizontal level plane is zero.

36. The television of claim 23, wherein the processor is further operable to:
compare accelerometer calibration information received from a first accelerometer module mounted on an axis of rotation of the horizontal level-adjustable mounting assembly with acceleration measurement information received from a second accelerometer module mounted on a horizontal axis of the television that perpendicularly intersects the axis of rotation of the horizontal level-adjustable mounting assembly; and
activate the television leveling module automatically in response to determining a difference between the accelerometer calibration information and the acceleration measurement information.

37. The television according to claim 36, wherein the processor is further operable to:
detect an initial consumer power on activation of the television; and
activate the television leveling module automatically in response to detecting the initial consumer power on activation of the television.

38. The television according to claim 36, wherein the processor is further operable to:
detect a movement of the television; and
activate the television leveling module in response to detecting the movement of the television.

39. The television according to claim 23, where the processor is further operable to:
detect a request to activate the television leveling module via a menu system of the television; and
activate the television leveling module in response to detecting the request to activate the television leveling module.

40. The television according to claim 23, where the processor is further operable to:
detect a change in voltage across a momentary switch associated with the television; and
activate the television leveling module in response to detecting the change in the voltage.

* * * * *